(12) United States Patent
Ohta

(10) Patent No.: US 10,793,708 B2
(45) Date of Patent: *Oct. 6, 2020

(54) PROPYLENE HOMOPOLYMER COMPOSITION FOR CAPACITOR FILM, METHOD FOR PRODUCING THE SAME, AND CAPACITOR FILM

(71) Applicants: MITSUI CHEMICALS, INC., Tokyo (JP); PRIME POLYMER CO., LTD., Tokyo (JP)

(72) Inventor: Katsutoshi Ohta, Ichihara (JP)

(73) Assignees: MITSUI CHEMICALS, INC., Tokyo (JP); PRIME POLYMER CO., LTD., Tokyo (JP)

(*) Notice: Subject to any disclaimer, the term of this patent is extended or adjusted under 35 U.S.C. 154(b) by 134 days.

This patent is subject to a terminal disclaimer.

(21) Appl. No.: 15/315,639

(22) PCT Filed: Jul. 30, 2015

(86) PCT No.: PCT/JP2015/071633
§ 371 (c)(1),
(2) Date: Dec. 1, 2016

(87) PCT Pub. No.: WO2016/017752
PCT Pub. Date: Feb. 4, 2016

(65) Prior Publication Data
US 2017/0183488 A1 Jun. 29, 2017

(30) Foreign Application Priority Data
Jul. 31, 2014 (JP) .................... 2014-156140

(51) Int. Cl.
| | |
|---|---|
| *C08L 23/12* | (2006.01) |
| *C08J 5/18* | (2006.01) |
| *H01G 4/18* | (2006.01) |
| *C08F 4/6592* | (2006.01) |
| *C08F 4/654* | (2006.01) |
| *C08F 110/06* | (2006.01) |
| *H01G 11/52* | (2013.01) |
| *H01G 9/02* | (2006.01) |
| *C08F 4/659* | (2006.01) |

(52) U.S. Cl.
CPC ............ *C08L 23/12* (2013.01); *C08F 4/654* (2013.01); *C08F 4/6592* (2013.01); *C08F 110/06* (2013.01); *C08J 5/18* (2013.01); *H01G 4/18* (2013.01); *H01G 9/02* (2013.01); *H01G 11/52* (2013.01); *C08F 4/65912* (2013.01); *C08F 4/65916* (2013.01); *C08J 2323/12* (2013.01); *C08J 2423/12* (2013.01); *C08L 2203/16* (2013.01); *C08L 2203/20* (2013.01); *C08L 2205/025* (2013.01); *Y02E 60/13* (2013.01); *Y02T 10/7022* (2013.01)

(58) Field of Classification Search
CPC .................... C08L 23/12; C08J 5/18

USPC ........................................................ 428/220
See application file for complete search history.

(56) References Cited

U.S. PATENT DOCUMENTS

| | | | | |
|---|---|---|---|---|
| 6,350,828 B1 * | 2/2002 | Takaoka | ................. | C08L 23/10 525/240 |
| 7,250,211 B1 * | 7/2007 | Minami | ................. | B32B 27/32 428/355 EN |
| 2010/0047544 A1 * | 2/2010 | Busch | ..................... | C08J 5/18 428/220 |
| 2011/0294016 A1 * | 12/2011 | Tamura | ................. | C08F 110/06 429/251 |
| 2011/0301309 A1 * | 12/2011 | Tamura | ................. | C08F 110/06 526/170 |
| 2012/0196982 A1 | 8/2012 | McLeod et al. | | |
| 2012/0329951 A1 | 12/2012 | Gloger et al. | | |
| 2015/0140266 A1 * | 5/2015 | Ishiwata | ................. | C08J 5/18 428/141 |

FOREIGN PATENT DOCUMENTS

| | | | |
|---|---|---|---|
| CN | 102272208 | A | 12/2011 |
| CN | 102292361 | A | 12/2011 |
| CN | 102356439 | A | 2/2012 |
| JP | H06-248133 | A | 9/1994 |
| JP | 1160842 | A1 * | 3/1999 |
| JP | 2001-040147 | A | 2/2001 |
| JP | 2002-348423 | A | 12/2002 |
| JP | 2010-254794 | A | 11/2010 |
| JP | 2010-254868 | A | 11/2010 |

(Continued)

OTHER PUBLICATIONS

Minami, Y.; Polypropylene-Based Resin Composition and Film Therefrom; Mar. 5, 1999; EPO; whole document (Year: 1999).*
International Search Report issued in International Patent Application No. PCT/JP2015/071633 dated Oct. 6, 2015.
Korean Notice of Allowance dated Feb. 9, 2018 in corresponding application No. 2018-009659396.
Chinese Office Action dated Jul. 27, 2018 in corresponding application No. 201580041840.

*Primary Examiner* — Tahseen Khan
(74) *Attorney, Agent, or Firm* — Foley & Lardner LLP

(57) ABSTRACT

Provided are a propylene homopolymer composition for a capacitor film, which can provide a film with excellent high-temperature voltage resistance and excellent thin-film stretchability, a method for producing the same, and a capacitor film. The propylene homopolymer composition for a capacitor film contains 50 to 99% by mass of a propylene homopolymer (A1) having predetermined characteristics and 1 to 50% by mass of a propylene homopolymer (B1) having predetermined characteristics, and has (i) a melt flow rate (MFR) of 1.0 to 10.0 g/10 min and (ii) a chlorine content of 2 ppm by mass or less.

8 Claims, No Drawings

(56) References Cited

FOREIGN PATENT DOCUMENTS

| | | | |
|---|---|---|---|
| JP | 2010-280795 A | 12/2010 | |
| JP | 2011-148896 A | 8/2011 | |
| JP | 2012-209541 A | 10/2012 | |
| JP | 2014-194010 A | 10/2014 | |
| JP | 2014-205799 A | 10/2014 | |
| KR | 201000130957 A | 12/2010 | |
| KR | 20110110304 A | 10/2011 | |
| WO | WO-2009/060944 A1 | 5/2009 | |
| WO | WO-2010/087328 A1 | 8/2010 | |
| WO | WO-2012/099167 A1 | 7/2012 | |
| WO | WO-2013105552 A1 * | 7/2013 | ................ C08J 5/18 |

* cited by examiner

ND CAPACITOR FILM

PROPYLENE HOMOPOLYMER COMPOSITION FOR CAPACITOR FILM, METHOD FOR PRODUCING THE SAME, AND CAPACITOR FILM

TECHNICAL FIELD

The present invention relates to a propylene homopolymer composition suitable for a capacitor film having excellent high-temperature voltage resistance and thin-film stretchability, a method for producing the same, and a capacitor film obtained by stretching the same.

BACKGROUND ART

Biaxially stretched polypropylene films have excellent mechanical properties, heat resistance, transparency, chemical stability, electrical properties, etc., and are thus widely used in various fields of not only packaging applications and tape applications but also electrical applications including capacitors and battery separators. In particular, stretched polypropylene capacitor films are used not only as high-voltage capacitors but also as noise-filtering capacitors and smoothing capacitors of switching power supplies, converters, inverters, and the like.

In these applications, there are demands for small and high-capacity capacitors. Moreover, when capacitors are used under high output power operation such as in hybrid car and electric vehicle applications, a large electric current flows through circuits such as transistors and capacitors, thus the temperature during use is increased, and accordingly there are also demands for capacitors having voltage resistance at high temperatures.

In order to reduce the size and increase the capacity of a capacitor, it is effective to make a film thin. However, a thin film results in a significantly low withstand voltage, and a capacitor film undergoes dielectric breakdown at a low voltage when a capacitor is used. On the other hand, from the film processing viewpoint, a film is likely to break during the processing of a thin film, thus resulting in a significantly low productivity.

Patent Literature 1 discloses a capacitor film, wherein polypropylene compositions having different MFRs (Melt Flow Rates) are used, the low-MFR polypropylene has a stereoregularity of 94 to 98%, the Mw/Mn is 4 to 7, and when a voltage load test is performed four times at 105° C. on a stretched film having a thickness of 1 to 10 µm, the change of capacitance in the fourth test is smaller than 20%.

Patent Literature 2 discloses a stretched capacitor film, wherein polypropylene produced with metallocene is used, the stereoregularity is 0.94 to 0.995, the integral amount of elution at 90° C. by CFC (cross-fractionation chromatography) is 0.5 wt % or less, the stretch ratio is 30 to 80, and the thickness is 1 to 50 µm.

Patent Literature 3 discloses a biaxially stretched polypropylene capacitor film, wherein polypropylene produced with metallocene is used, the stereoregularity is 0.90 to 0.98, the Mw/Mn is 2 to 5, the center-line roughness is 10 to 50 nm, the thickness is 1 to 5 µm, and as for a capacitor dielectric, a reduction of dielectric breakdown voltage is suppressed from normal temperature (25° C.) to high temperature (100° C.).

Patent Literature 4 discloses a biaxially stretched polypropylene capacitor film, wherein the mesopentad fraction is 94% or more and less than 98%, the Mw is 250000 or more and 450000 or less, the Mw/Mn is 4 or more and 7 or less, the value obtained by subtracting the differential distribution value when the logarithm of molecular weight Log (M)=6 from the differential distribution value when the logarithm of molecular weight Log (M)=4.5 is 9% or more and 15% or less on a molecular weight distribution curve, and a polypropylene raw material resin, the Mw/Mn of which is adjusted by peroxidative degradation treatment of the polypropylene resin, is used.

Patent Literature 5 discloses a metal-deposited capacitor film composed of polypropylenes having different mesopentad fractions.

Patent Literature 6 discloses a biaxially stretched polypropylene capacitor film composed of a polypropylene resin having a molecular weight distribution of 5 to 10 and a polypropylene resin having a molecular weight distribution of 3 or less and a mesopentad fraction of 30 to 60% or less.

CITATION LIST

Patent Literature

Patent Literature 1: JP2010-254794A
Patent Literature 2: WO2010/087328
Patent Literature 3: JP2012-209541A
Patent Literature 4: WO2012/099167
Patent Literature 5: JP2010-280795A
Patent Literature 6: JP2014-205799A

SUMMARY OF INVENTION

Technical Problem

However, with the technique described in Patent Literature 1, high-temperature voltage resistance is insufficient. With the techniques described in Patent Literatures 2 and 3, stretchability necessary for thin-film formation is insufficient. With the technique described in Patent Literature 4, high-temperature voltage resistance is insufficient. With the technique described in Patent Literature 5, voltage resistance is insufficient because polypropylene having a low mesopentad fraction is contained. With the technique described in Patent Literature 6, although the stretchability of a film is improved when a polypropylene resin having a mesopentad fraction of 60% is contained, high-temperature voltage resistance is insufficient because the withstand voltage is lowered. Accordingly, the development of a capacitor film having excellent high-temperature voltage resistance and excellent thin-film stretchability is desired.

An object of the present invention is to provide a propylene homopolymer composition for a capacitor film, which can provide a film with excellent high-temperature voltage resistance and excellent thin-film stretchability, a method for producing the same, and a capacitor film.

Solution to Problem

The present invention encompasses the following matters.

[1] A propylene homopolymer composition for a capacitor film, containing 50 to 99% by mass of a propylene homopolymer (A1) having characteristics (A-i) to (A-iii) below and 1 to 50% by mass of a propylene homopolymer (B1) having characteristics (B-i) to (B-ii) below (with a sum of the propylene homopolymer (A1) and the propylene homopolymer (B1) being 100% by mass), and having:

(i) a melt flow rate (MFR) of 1.0 to 10.0 g/10 min, and
(ii) a chlorine content of 2 ppm by mass or less, wherein (A-i) a mesopentad fraction (mmmm) measured by $^{13}$C-NMR is 0.930 or more, (A-ii) a half width of an elution peak measured by temperature rising elution fractionation (TREF) is less than 4.0° C., (A-iii) a molecular weight distribution Mw/Mn measured by GPC is less than 3.0, (B-i) a mesopentad fraction (mmmm) measured by $^{13}$C-NMR is 0.950 or more, and (B-ii) a molecular weight distribution Mw/Mn measured by GPC is 3.0 or more.

[2] A propylene homopolymer composition for a capacitor film, containing 50 to 99% by mass of a propylene homopolymer (A2) having characteristics (A-i) to (A-u) below and 1 to 50% by mass of a propylene homopolymer (B2) having characteristics (B-i) to (B-iii) below (with a sum of the propylene homopolymer (A2) and the propylene homopolymer (B2) being 100% by mass), and having:

(i) a melt flow rate (MFR) of 1.0 to 10.0 g/10 min, and (ii) a chlorine content of 2 ppm by mass or less, wherein (A-i) a mesopentad fraction (mmmm) measured by $^{13}$C-NMR is 0.930 or more, (A-ii) a half width of an elution peak measured by temperature rising elution fractionation (TREF) is less than 4.0° C., (B-i) a mesopentad fraction (mmmm) measured by $^{13}$C-NMR is 0.950 or more, (B-ii) a molecular weight distribution Mw/Mn measured by GPC is 3.0 or more, and (B-iii) a half width of an elution peak measured by temperature rising elution fractionation (TREF) is 4.0° C. or more.

[3] The propylene homopolymer composition for a capacitor film according to [1] or [2], wherein the propylene homopolymer (A1) or the propylene homopolymer (A2) is produced using a metallocene catalyst.

[4] The propylene homopolymer composition for a capacitor film according to any one of [1] to [3], wherein the propylene homopolymer (B1) or the propylene homopolymer (B2) is produced using a Ziegler-Natta catalyst.

[5] A capacitor film having a thickness of 1 to 50 µm, containing the propylene homopolymer composition for a capacitor film according to any one of [1] to [4].

[6] The capacitor film according to claim 5, having a thickness of 1 to 4 µm.

[7] A capacitor film obtained by stretching the propylene homopolymer composition for a capacitor film according to any one of [1] to [4] at an area stretch ratio (area ratio of length×width) of 30 to 80.

[8] The capacitor film according to any one of [5] to [7], which is a capacitor separator film.

[9] A method for producing a propylene homopolymer composition for a capacitor film, including:

producing a propylene homopolymer (A1) having characteristics (A-i) to (A-iii) below using a metallocene catalyst, producing a propylene homopolymer (B1) having characteristics (B-i) to (B-ii) below using a Ziegler-Natta catalyst, and mixing 50 to 99% by mass of the propylene homopolymer (A1) with 1 to 50% by mass of the propylene homopolymer (B1) (with a sum of the propylene homopolymer (A1) and the propylene homopolymer (B1) being 100% by mass), (i) the propylene homopolymer composition for a capacitor film having a melt flow rate (MFR) of 1.0 to 10.0 g/10 min, and (ii) the propylene homopolymer composition for a capacitor film having a chlorine content of 2 ppm by mass or less, wherein (A-i) a mesopentad fraction (mmmm) measured by $^{13}$C-NMR is 0.930 or more, (A-ii) a half width of an elution peak measured by temperature rising elution fractionation (TREF) is less than 4.0° C., (A-iii) a molecular weight distribution Mw/Mn measured by GPC is less than 3.0, (B-i) a mesopentad fraction (mmmm) measured by $^{13}$C-NMR is 0.950 or more, and (B-ii) a molecular weight distribution Mw/Mn measured by GPC is 3.0 or more.

[10] A method for producing a propylene homopolymer composition for a capacitor film, including:

producing a propylene homopolymer (A2) having characteristics (A-i) to (A-u) below using a metallocene catalyst, producing a propylene homopolymer (B2) having characteristics (B-i) to (B-iii) below using a Ziegler-Natta catalyst, and mixing 50 to 99% by mass of the propylene homopolymer (A2) with 1 to 50% by mass of the propylene homopolymer (B2) (with a sum of the propylene homopolymer (A2) and the propylene homopolymer (B2) being 100% by mass), (i) the propylene homopolymer composition for a capacitor film having a melt flow rate (MFR) of 1.0 to 10.0 g/10 min, and (ii) the propylene homopolymer composition for a capacitor film having a chlorine content of 2 ppm by mass or less, wherein (A-i) a mesopentad fraction (mmmm) measured by $^{13}$C-NMR is 0.930 or more, (A-ii) a half width of an elution peak measured by temperature rising elution fractionation (TREF) is less than 4.0° C., (B-i) a mesopentad fraction (mmmm) measured by $^{13}$C-NMR is 0.950 or more, (B-ii) a molecular weight distribution Mw/Mn measured by GPC is 3.0 or more, and (B-iii) a half width of an elution peak measured by temperature rising elution fractionation (TREF) is 4.0° C. or more.

Advantageous Effect of the Invention

The present invention can provide a propylene homopolymer composition for a capacitor film, which can provide a film with excellent high-temperature voltage resistance and excellent thin-film stretchability, a method for producing the same, and a capacitor film.

DESCRIPTION OF EMBODIMENT

The propylene homopolymer composition for a capacitor film of the present invention (hereinafter also referred to as a propylene homopolymer composition) satisfies the above requirements and therefore has excellent thin-film stretchability and makes it easy to produce a thin film. Moreover, a film obtained from the propylene homopolymer composition of the present invention has excellent high-temperature voltage resistance and is suitable for a capacitor film. As will be described below, in the present invention, the thickness dependency of the high-temperature voltage resistance of the capacitor film in particular is small and, therefore, the high-temperature voltage resistance is particularly excellent when the thickness is 4 μm or less.

As for the propylene homopolymer (A1), the half width of the elution peak measured by TREF is narrow (A-ii), and the molecular weight distribution is also narrow (A-iii). Accordingly, it is expected that a capacitor film composed of a propylene homopolymer composition containing 50% by mass or more of the propylene homopolymer (A1) has a uniform crystal structure, also has a small crystal size, and is less likely to have defects (e.g., voids and the size of amorphous portions) that serve as starting points of dielectric breakdown. The voltage resistance of a thin film is considered to be severely affected by defects, and it is therefore considered that the voltage resistance is not lowered when a low-defect film is made thin.

On the other hand, the propylene homopolymer (B1) has a broad molecular weight distribution (B-ii) and therefore contains a high molecular weight component. It is considered that molecular chains are more entangled in a high molecular weight component than in a low molecular weight component, and a high molecular weight component is unlikely to break in film stretching process. It is therefore conjectured that as a result of blending 50% by mass or less of the propylene homopolymer (B1), stretchability is provided without deteriorating the voltage resistance of a film.

Below, the present invention will now be described in detail. The propylene homopolymers (A1) and (A2) may be collectively referred to as a "propylene homopolymer (A)", and the propylene homopolymers (B1) and (B2) may be collectively referred to as a "propylene homopolymer (B)".

<Propylene Homopolymer Composition>

The propylene homopolymer composition of the present invention contains 50 to 99% by mass of the propylene homopolymer (A) and 1 to 50% by mass of the propylene homopolymer (B), with the sum of the propylene homopolymer (A) and the propylene homopolymer (B) being 100% by mass. The propylene homopolymer composition of the present invention preferably contains 60 to 99% by mass of the propylene homopolymer (A) and 1 to 40% by mass of the propylene homopolymer (B), more preferably 70 to 95% by mass of the propylene homopolymer (A) and 5 to 30% by mass of the propylene homopolymer (B), and even more preferably 75 to 90% by mass of the propylene homopolymer (A) and 10 to 25% by mass of the propylene homopolymer (B).

When the proportion of the propylene homopolymer (B) exceeds 50% by mass, the high-temperature voltage resistance of a film is decreased, and the high-temperature voltage resistance is significantly decreased especially when the film is thin. This is because the propylene homopolymer (B) has the feature of lowering the high-temperature voltage resistance of a film and increasing the film thickness dependency of high-temperature voltage resistance. Spherulites undergo dielectric breakdown at a higher voltage than non-crystallites as reported in "Takamasa Yamakita, Tomio Ariyasu, IEEJ Transactions on Fundamentals and Materials, Vol. 110, No. 11, pp. 817-823, 1990", indicating that a higher crystallinity results in a higher voltage resistance. From this viewpoint, it is inferred that the film of the propylene homopolymer (B) has a low high-temperature voltage resistance because the molecular weight distribution of the propylene homopolymer (B) is broad, the stereoregularity distribution is also broad in many cases, thus low melting point components are contained in the film, and as a result the crystallinity at high temperatures is decreased.

On the other hand, when the proportion of the propylene homopolymer (B) is less than 1% by mass, thin-film stretchability is decreased. This is because the effect of the propylene homopolymer (B) having excellent stretchability is not provided.

[Requirement (i)]

The propylene homopolymer composition of the present invention has a melt flow rate (MFR, ASTM D1238, 230° C., 2.16 kg load) of 1.0 to 10.0 g/10 min, preferably 1.5 to 8.0 g/10 min, more preferably 2.0 to 6.0 g/10 min, and even more preferably 2.5 to 5.0 g/10 min.

When the MFR is less than 1.0 g/10 min, it is difficult to form a primary film using an extruder, and also separation from chucks and the like occur during stretching, thus failing to yield a desired film. When the MFR exceeds 10.0 g/10 min, frequent film break during stretching and the like occur, and film productivity is significantly decreased. The MFR can be set within the above range by suitably changing the MFRs and the blending ratio of the propylene homopolymer (A) and the propylene homopolymer (B).

[Requirement (ii)]

The propylene homopolymer composition of the present invention has a chlorine content of 2 ppm by mass or less (0 to 2 ppm by mass), preferably 1.5 ppm by mass or less, and more preferably 1 ppm by mass or less. When the chlorine content exceeds 2 ppm by mass, not only the voltage resistance of the resulting film is decreased but also the long-term capacitor characteristics are impaired. It is understood that the electric field in the vicinity of chlorine ions inside the film is locally increased when a capacitor is used, dielectric breakdown is likely to occur from there, and the withstand voltage is thus decreased. The chlorine content can be controlled within the above range by increasing the blending amount of the propylene homopolymer (A) obtained with a metallocene catalyst described later or subjecting the propylene homopolymer (B) to after-treatment.

The mesopentad fraction (mmmm) of the propylene homopolymer composition of the present invention measured by $^{13}$C-NMR is preferably 0.940 or more, more preferably 0.945 or more and 0.995 or less. When the mesopentad fraction (mmmm) is less than 0.940, the high-temperature voltage resistance of a film may be decreased. On the other hand, when the mesopentad fraction (mmmm) exceeds 0.995, stress during stretching is increased, and thus a film that is as thin as necessary for capacitor applications may not be obtained, or a film having a uniform thickness distribution may not be obtained.

<Propylene Homopolymer (A1)>

[Requirement (A-i)]

The propylene homopolymer (A1) has a mesopentad fraction (mmmm) measured by $^{13}$C-NMR (nuclear magnetic resonance) of 0.930 or more, preferably 0.935 or more and 0.995 or less, more preferably 0.940 or more and 0.995 or less, and even more preferably 0.945 or more and 0.990 or less. When the mmmm is less than 0.930, a film having a desired voltage resistance cannot be obtained. When the mmmm exceeds 0.995, stress during stretching is increased, and thus a film that is as thin as necessary for capacitor applications may not be obtained, or a film having a uniform thickness distribution may not be obtained.

[Requirement (A-ii)]

The propylene homopolymer (A1) has an elution peak half width of less than 4.0° C., preferably 2.0° C. or more and 3.8 or less, more preferably 2.5° C. or more and 3.6° C. or less, and even more preferably 3.0° C. or more and 3.5° C. or less on a curve (TREF elution curve) showing the amount of components eluted relative to the elution temperature measured by temperature rising elution fractionation (TREF) using o-dichlorobenzene. When the elution peak half width is 4.0° C. or more, the high-temperature voltage resistance of a film is decreased, and the high-temperature voltage resistance is significantly decreased especially when the film is thin. It is inferred that when the half width, i.e., stereoregularity distribution, is broad, the melting-point distribution of a film is broad, low melting point components are increased, and as a result the crystallinity at high temperatures is decreased.

[Requirement (A-iii)]

The propylene homopolymer (A1) has a molecular weight distribution (Mw/Mn, the value obtained by dividing weight average molecular weight Mw by number average molecular weight Mn) measured by gel permeation chromatography (GPC) of less than 3.0, preferably 2.0 or more and less than 3.0, more preferably 2.3 or more and less than 3.0, and even more preferably 2.5 or more and 2.8 or less.

<Propylene Homopolymer (A2)>

[Requirement (A-i) and Requirement (A-ii)]

Requirement (A-i) and requirement (A-ii) are the same as those of the propylene homopolymer (A1).

<Propylene Homopolymer (A)>

The melt flow rate (MFR) of the propylene homopolymer (A) is not particularly limited, and is preferably 1 to 100 g/10 min, more preferably 1 to 50 g/10 min, even more preferably 2 to 30 g/10 min, and particularly preferably 3 to 10 g/10 min. When the MFR is less than 1 g/10 min, gel may appear inside a film. When the MFR exceeds 100 g/10 min, film break during stretching and the like occur, and film productivity may be decreased.

As for the propylene homopolymer (A), the sum of the proportion of heterologous bonds based on 2,1-insertion and the proportion of heterologous bonds based on 1,3-insertion of propylene monomers in all propylene constituting units determined from a $^{13}$C-NMR spectrum is preferably 0.2 mol % or less, more preferably 0.15 mol % or less, and even more preferably 0.1 mol % or less. When the sum exceeds 0.2 mol %, crystals of the propylene homopolymer (A) are increasingly disturbed and, therefore, in some cases, crystalline components contained in the resulting film are reduced, and high-temperature voltage resistance is decreased.

As long as the chlorine content of the propylene homopolymer composition is 2 ppm by mass or less, the chlorine content of the propylene homopolymer (A) is not particularly limited, and is preferably 2 ppm by mass or less, more preferably 1.5 ppm by mass or less, and even more preferably 1 ppm by mass or less.

<Propylene Homopolymer (B1)>

[Requirement (B-i)]

The propylene homopolymer (B1) has a mesopentad fraction (mmmm) measured by $^{13}$C-NMR (nuclear magnetic resonance) of 0.950 or more, preferably 0.950 or more and 0.995 or less, even more preferably 0.955 or more and 0.995 or less, and even more preferably 0.960 or more and 0.990 or less. When the mmmm is less than 0.950, a film having a desired voltage resistance cannot be obtained. When the mmmm exceeds 0.995, stress during stretching is increased, and thus a film that is as thin as necessary for capacitor applications may not be obtained, or a film having a uniform thickness distribution may not be obtained.

[Requirement (B-ii)]

The propylene homopolymer (B1) has a molecular weight distribution (Mw/Mn, the value obtained by dividing weight average molecular weight Mw by number average molecular weight Mn) measured by gel permeation chromatography (GPC) of 3.0 or more, preferably 3.0 or more and 12.0 or less, more preferably 3.5 or more and 12.0 or less, even more preferably 6.0 or more and 12.0 or less, and particularly preferably 8.0 or more and 12.0 or less. When the molecular weight distribution is less than 3.0, no enhancement of the stretchability of a thin film is recognized.

<Propylene Homopolymer (B2)>

[Requirement (B-i) and Requirement (B-ii)]

Requirement (B-i) and requirement (B-ii) are the same as those of the propylene homopolymer (B1).

[Requirement (B-iii)]

The propylene homopolymer (B2) has an elution peak half width of 4.0° C. or more, preferably 4.0° C. or more and 5.0° C. or less, more preferably 4.0° C. or more and 4.8° C. or less, and even more preferably 4.0° C. or more and 4.5° C. or less on a curve (TREF elution curve) showing the amount of components eluted relative to the elution temperature measured by temperature rising elution fractionation (TREF) using o-dichlorobenzene. When the elution peak half width is less than 4.0° C., stretchability may be decreased. When the elution peak half width exceeds 5.0° C., the high-temperature voltage resistance of a film may be decreased.

<Propylene Homopolymer (B)>

The melt flow rate (MFR) of the propylene homopolymer (B) is not particularly limited, and is preferably 0.5 to 10 g/10 min, more preferably 1 to 7 g/10 min, and even more preferably 2 to 5 g/10 min. When the MFR is less than 0.5, gel may appear inside a film. On the other hand, when the MFR exceeds 10 g/10 min, film productivity may be decreased. Moreover, the size of crystals inside the film does not become small during stretching, and thus the effect of enhancing the high-temperature voltage resistance provided by film stretching may be reduced.

As for the propylene homopolymer (B), the sum of the proportion of heterologous bonds based on 2,1-insertion and the proportion of heterologous bonds based on 1,3-insertion of propylene monomers in all propylene constituting units determined from a $^{13}$C-NMR spectrum is preferably 0.2 mol % or less, more preferably 0.15 mol % or less, and even more preferably 0.1 mol % or less. When the sum exceeds 0.2 mol %, crystals of the propylene homopolymer (B) are increasingly disturbed and, therefore, in some cases, crystalline components in the resulting film are reduced, and high-temperature voltage resistance is decreased.

As long as the chlorine content of the propylene homopolymer composition is 2 ppm by mass or less, the chlorine content of the propylene homopolymer (B) is not particularly limited, and is preferably 2 ppm by mass or less, more preferably 1.5 ppm by mass or less, and even more preferably 1 ppm by mass or less.

<Method for Producing Propylene Homopolymer (A)>

Although the method for producing the propylene homopolymer (A) is not particularly limited, from the viewpoint of high-temperature voltage resistance, it is preferable to produce the propylene homopolymer (A) using a metallocene catalyst. A polymerization catalyst containing a metallocene compound having a cyclopentadienyl skeleton within the molecule is preferably used as the metallocene catalyst.

Examples of the metallocene compound having a cyclopentadienyl skeleton within the molecule include metallocene compounds represented by formula [I] below and bridged metallocene compounds represented by formula [II] below. Among these, the metallocene compound is preferably a bridged metallocene compound represented by formula [II] below.

[Formula 1]

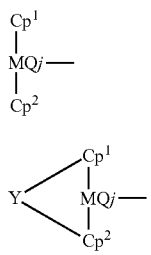

In formulae [I] and [II] above, M represents a titanium atom, a zirconium atom, or a hafnium atom. Q represents a halogen atom, a hydrocarbon group, an anionic ligand, or a neutral ligand capable of coordination with a lone electron pair. $Cp^1$ and $Cp^2$ are cyclopentadienyl groups or substituted cyclopentadienyl groups capable of forming a sandwich structure with M. $Cp^1$ and $Cp^2$ may be mutually the same or different. j is an integer of 1 to 4, and when j is 2 or greater, Q may be mutually the same or different.

The substituted cyclopentadienyl group encompasses an indenyl group, a fluorenyl group, an azulenyl group, and such a group substituted with one or more hydrocarbyl groups, and in the case of an indenyl group, a fluorenyl group, or an azulenyl group, some of the double bonds of an unsaturated ring condensed with a cyclopentadienyl group may be hydrogenated.

In formula (II) above, Y represents a divalent hydrocarbon group having 1 to 20 carbon atoms, a divalent halogenated hydrocarbon group having 1 to 20 carbon atoms, a divalent silicon-containing group, a divalent germanium-containing group such as —Ge—, a divalent tin-containing group such as —Sn—, —O—, —CO—, —S—, —SO—, —SO$_2$—, —N(Ra)—, —P(Ra)—, —P(O)(Ra)—, —B(Ra)—, or —Al(Ra)—. Ra is a hydrocarbon group having 1 to 20 carbon atoms, a halogenated hydrocarbon group having 1 to 20 carbon atoms, a hydrogen atom, a halogen atom, or a nitrogen compound residue in which one or two hydrocarbon groups having 1 to 20 carbon atoms are bonded to a nitrogen atom.

The polymerization catalyst containing a metallocene compound is preferably a metallocene catalyst containing a bridged metallocene compound represented by formula [III] below, at least one compound selected from the group consisting of organometallic compounds, organoaluminum oxy compounds, and compounds capable of forming an ion pair by reaction with a metallocene compound, and optionally a particulate carrier.

[Formula 2]

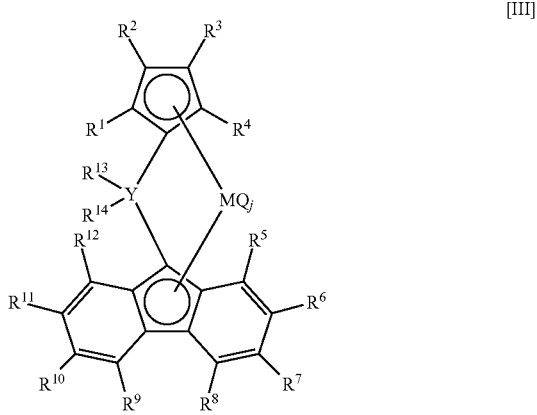

In formula [III] above, $R^1$ to $R^{14}$ are each independently a hydrogen atom, a hydrocarbon group, or a silicon-containing group. $R^1$ to $R^{14}$ may be mutually the same or different.

Examples of the hydrocarbon group include linear hydrocarbon groups such as a methyl group, an ethyl group, a n-propyl group, an allyl group, a n-butyl group, a n-pentyl group, a n-hexyl group, a n-heptyl group, a n-octyl group, a n-nonyl group, and a n-decanyl group; branched hydrocarbon groups such as an isopropyl group, a tert-butyl group, an amyl group, a 3-methylpentyl group, a 1,1-diethylpropyl group, a 1,1-dimethylbutyl group, a 1-methyl-1-propylbutyl group, a 1,1-propylbutyl group, a 1,1-dimethyl-2-methylpropyl group, and a 1-methyl-1-isopropyl-2-methylpropyl group; cyclic saturated hydrocarbon groups such as a cyclopentyl group, a cyclohexyl group, a cycloheptyl group, a cyclooctyl group, a norbornyl group, and an adamantyl group; cyclic unsaturated hydrocarbon groups such as a phenyl group, a tolyl group, a naphthyl group, a biphenyl group, a phenanthryl group, and an anthracenyl group; saturated hydrocarbon groups substituted with a cyclic unsaturated hydrocarbon group such as a benzyl group, a cumyl group, a 1,1-diphenylethyl group, or a triphenylmethyl group; and hetero atom-containing hydrocarbon groups such as a methoxy group, an ethoxy group, a phenoxy group, a furyl group, an N-methylamino group, an N,N-dimethylamino group, an N-phenylamino group, a pyrryl group, and a thienyl group.

Examples of the silicon-containing group include a trimethylsilyl group, a triethylsilyl group, a dimethylphenylsilyl group, a diphenylmethylsilyl group, and a triphenylsilyl group.

Adjacent $R^5$ to $R^{12}$ substituents may be bonded to each other to form a ring.

Examples of such a substituted fluorenyl group include a benzofluorenyl group, a dibenzofluorenyl group, an octahydrodibenzofluorenyl group, an octamethyloctahydrodibenzofluorenyl group, and an octamethyltetrahydrodicyclopentafluorenyl group.

Preferably, $R^1$, $R^2$, $R^3$, and $R^4$ are hydrogen atoms or hydrocarbon groups having 1 to 20 carbon atoms. More preferably, $R^2$ and $R^4$ are hydrocarbon groups having 1 to 20 carbon atoms. Even more preferably, $R^1$ and $R^3$ are hydrogen atoms, and $R^2$ and $R^4$ are linear or branched alkyl groups having 1 to 5 carbon atoms.

Preferably, $R^5$ to $R^{12}$ are hydrogen atoms or hydrocarbon groups having 1 to 20 carbon atoms. Examples of hydrocarbon groups having 1 to 20 carbon atoms include the aforementioned hydrocarbon groups. Preferably, neither $R^7$ nor $R^{11}$ is a hydrogen atom, and more preferably, none of $R^6$, $R^7$, $R^{10}$ and $R^{11}$ are hydrogen atoms.

Y is a group 14 element, is preferably carbon, silicon or germanium, and is more preferably carbon.

$R^{13}$ and $R^{14}$ are preferably hydrocarbon groups having 1 to 20 carbon atoms, and more preferably alkyl groups having 1 to 3 carbon atoms or aryl groups having 6 to 20 carbon atoms. Specifically, $R^{13}$ and $R^{14}$ are preferably methyl groups, ethyl groups, phenyl groups, tolyl groups, and the like. $R^{13}$ and $R^{14}$ may be mutually the same or different, and may be mutually bonded to form a ring. Also, $R^{13}$ and $R^{14}$ may be mutually bonded to adjacent $R^5$ to $R^{12}$ substituents or adjacent $R^1$ to $R^4$ substituents to form a ring.

M is a group 4 transition metal and is preferably a titanium atom, a zirconium atom, or a hafnium atom.

Q is a halogen, a hydrocarbon group, an anionic ligand, or a neutral ligand capable of coordination with a lone electron pair. j is an integer of 1 to 4, and when j is 2 or greater, Q may be mutually the same or different.

Specific examples of the halogen include a fluorine atom, a chlorine atom, a bromine atom, and an iodine atom. Specific examples of the hydrocarbon group include hydrocarbon groups as those described above.

Specific examples of the anionic ligand include alkoxy groups such as methoxy, tert-butoxy, and phenoxy, carboxylate groups such as acetate and benzoate, and sulfonate groups such as mesylate and tosylate.

Specific examples of the neutral ligand capable of coordination with a lone electron pair include organophosphorus compounds such as trimethylphosphine, triethylphosphine, triphenylphosphine, and diphenylmethylphosphine, and ethers such as tetrahydrofuran, diethyl ether, dioxane, and 1,2-dimethoxyethane.

At least one Q is preferably a halogen or an alkyl group.

Examples of bridged metallocene compounds represented by formula [III] above include compounds disclosed in WO01/27124, WO2014/050816, and WO2014/050817. Among those, preferable specific examples include [3-(1',1',4',4',7',7',10',10'-octamethyloctahydrodibenzo[b,h]fluoren-12'-yl)(3-methyl-5-tert-butyl-1,2,3,3a-tetrahydropentalene)]zirconium dichloride, [3-(1',1',4',4',7',7',10',10'-octamethyloctahydrodibenzo[b,h]fluoren-12'-yl)(3-phenyl-5-tert-butyl-1,2,3,3a-tetrahydropentalene)]zirconium dichloride, [3-(1',1',4',4',7',7',10',10'-octamethyloctahydrodibenzo[b,h]fluoren-12'-yl)(1-methyl-3-phenyl-5-tert-butyl-1,2,3,3a-tetrahydropentalene)]zirconium dichloride, [3-(1',1',4',4',7',7',10',10'-octamethyloctahydrodibenzo[b,h]fluoren-12'-yl)(1-phenyl-3-methyl-5-tert-butyl-1,2,3,3a-tetrahydropentalene)]zirconium dichloride, [3-(1',1',4',4',7',7',10',10'-octamethyloctahydrodibenzo[b,h]fluoren-12'-yl)(1-p-tolyl-3-methyl-5-tert-butyl-1,2,3,3a-tetrahydropentalene)]zirconium dichloride, [3-(1',1',4',4',7',7',10',10'-octamethyloctahydrodibenzo[b,h]fluoren-12'-yl)(1,3-dimethyl-5-tert-butyl-1,2,3,3a-tetrahydropentalene)] zirconium dichloride, [3-(1',1',4',4',7',7',10',10'-octamethyloctahydrodibenzo[b,h]fluoren-12'-yl)(1,3-diphenyl-5-tert-butyl-1,2,3,3a-tetrahydropentalene)] zirconium dichloride, [3-(1',1',4',4',7',7',10',10'-octamethyloctahydrodibenzo[b,h]fluoren-12'-yl)(1,3-diphenyl-1-methyl-5-tert-butyl-1,2,3,3a-tetrahydropentalene)]zirconium dichloride, [3-(1',1',4',4',7',7',10',10'-octamethyloctahydrodibenzo[b,h]fluoren-12'-yl) (1,3-di(p-tolyl)-1-methyl-5-tert-butyl-1,2,3,3a-tetrahydropentalene)]zirconium dichloride, [3-(1',1',4',4',7',7',10',10'-octamethyloctahydrodibenzo[b,h]fluoren-12'-yl) (1,2,3,3a-tetrahydropentalene)]zirconium dichloride, [3-(1',1',4',4',7',7',10',10'-octamethyloctahydrodibenzo[b,h] fluoren-12'-yl)(1,1-dimethyl-5-tert-butyl-1,2,3,3a-tetrahydropentalene)]zirconium dichloride, [3-(1',1',4',4',7',7',10',10'-octamethyloctahydrodibenzo[b,h]fluoren-12'-yl) (1,1-dimethyl-3-phenyl-5-tert-butyl-1,2,3,3a-tetrahydropentalene)]zirconium dichloride, [3-(1',1',4',4',7',7',10',10'-octamethyloctahydrodibenzo[b,h]fluoren-12'-yl) (1,1,3-trimethyl-5-trimethylsilyl-1,2,3,3a-tetrahydropentalene)]zirconium dichloride, [3-(1',1',4',4',7',7',10',10'-octamethyloctahydrodibenzo[b,h]fluoren-12'-yl) (1,1,3-trimethyl-5-ethyl-1,2,3,3a-tetrahydropentalene)] zirconium dichloride, [3-(1',1',4',4',7',7',10',10'-octamethyloctahydrodibenzo[b,h]fluoren-12'-yl)(1,1,3-trimethyl-5-tert-butyl-1,2,3,3a-tetrahydropentalene)] zirconium dichloride, [3-(1',1',4',4',7',7',10',10'-octamethyloctahydrodibenzo[b,h]fluoren-12'-yl)(1,1,3-triethyl-2-methyl-5-tert-butyl-1,2,3,3a-tetrahydropentalene)]zirconium dichloride, and [3-(1',1',4',4',7',7',10',10'-octamethyloctahydrodibenzo[b,h]fluoren-12'-yl)(1,1,3,5-tetramethyl-1,2,3,3a-tetrahydropentalene)] zirconium dichloride. In the polymerization of olefin using an above metallocene compound, the polymerization temperature tends to affect the stereoregularity of the resulting polymer. These metallocene compounds show high stereo-specificity in the polymerization of α-olefins having 3 or more carbon atoms and thus tend to be able to yield olefin polymers with high stereoregularity even under conditions of a high polymerization temperature. Accordingly, it can be considered as a particularly preferable embodiment in terms of process simplicity, production cost, and the like.

Titanium derivatives and hafnium derivatives of these may be used. One of these may be used, or two or more may be used in combination. Note that the metallocene compounds usable for the present invention are not at all limited to the compounds provided as examples above.

Concerning the positional numbers used in the names of the above compounds, [3-(1',1',4',4',7',7',10',10'-octamethyl-octahydrodibenzo[b,h]fluorenyl)(1,1,3-trimethyl-5-tert-butyl-1,2,3,3a-tetrahydropentalene)]zirconium dichloride, [1-(1',1',4',4',7',7',10',10'-octamethyloctahydrodibenzo[b,h] fluoren-12'-yl)(5-tert-butyl-1-methyl-3-iso-propyl-1,2,3,4-tetrahydropentalene)]zirconium dichloride, and [8-(1',1',4', 4',7',7',10',10'-octamethyloctahydrodibenzo[b,h]fluoren-12'-yl)(2-(1-adamantyl)-8-methyl-3,3b,4,5,6,7,7a,8-octahydrocyclopenta[a]indene]zirconium dichloride are referred to as examples and represented by formulae [IV], [VI], and [VII] below, respectively. Concerning formulae [VI] and [VII], one optical isomer of each compound is shown. Although optical isomers are not particularly referred to, all isomers are encompassed without departing from the scope of the present invention.

[Formula 3]

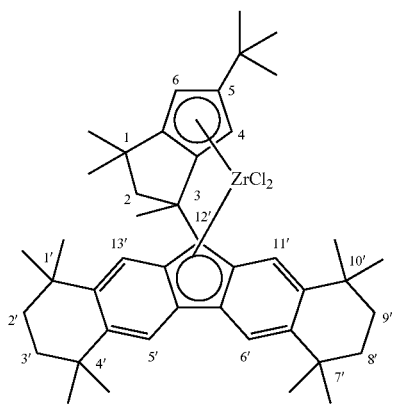

[IV]

[Formula 4]

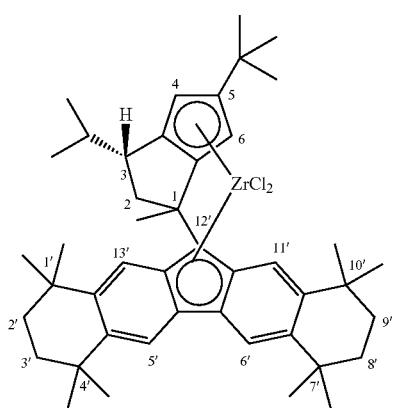

[VI]

[Formula 5]

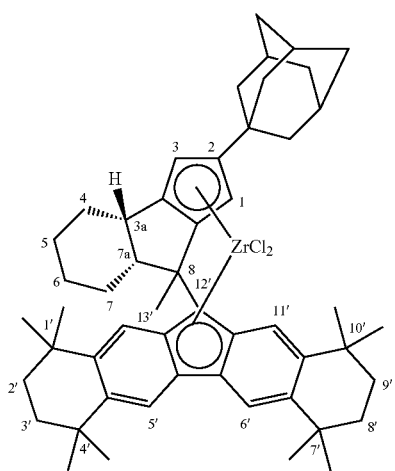

[VII]

Compounds disclosed in WO01/27124 and JP11-315109A by the present applicant can be used without limitations as the at least one compound (cocatalyst) selected from the group consisting of organometallic compounds, organoaluminum oxy compounds, and compounds that form an ion pair by reaction with a metallocene compound and the optional particulate carrier that are used in combination with the bridged metallocene compound represented by formula [III] above.

Examples of a method for controlling the propylene homopolymer (A1) to simultaneously satisfy the requirements (A-i) to (A-iii) and a method for controlling the propylene homopolymer (A2) to simultaneously satisfy the requirements (A-i) to (A-ii) include methods in which a catalyst as described above is used and the polymerization temperature and such polymerization conditions are suitably set.

A specific example is a method in which [8-(1',1',4',4',7', 7',10',10'-octamethyloctahydrodibenzo[b,h]fluoren-12'-yl) (2-(1-adamantyl)-8-methyl-3,3b,4,5,6,7,7a,8-octahydrocyclopenta[a]indene]zirconium dichloride is used as a catalyst, the polymerization temperature is 50 to 90° C. and preferably 60 to 80° C., and hydrogen is supplied together with raw materials such that the amount of hydrogen supplied is 0.03 to 0.3 mol %, preferably 0.06 to 0.21 mol %, and more preferably 0.07 to 0.18 mol %.

In the Examples of the present application described below, the propylene homopolymer of the present invention is produced by performing pre-polymerization in the concomitant presence of [3-(1',1',4',4',7',7',10',10'-octamethyl-octahydrodibenzo[b,h]fluoren-12'-yl)(1,1,3-trimethyl-5-tert-butyl-1,2,3,3a-tetrahydropentalene)]zirconium dichloride or [8-(1',1',4',4',7',7',10',10'-octamethyloctahydrodibenzo[b,h]fluoren-12'-yl)(2-(1-adamantyl)-8-methyl-3,3b,4,5,6,7,7a,8-octahydrocyclopenta[a]indene]zirconium dichloride as a metallocene compound and, as cocatalysts, a solid catalyst containing methylaluminoxane supported on a silica carrier and triethylaluminum, and subsequently performing multi-stage main polymerization. However, the present invention is not limited to these conditions.

<Method for Producing Propylene Homopolymer (B)>

Although the method for producing the propylene homopolymer (B) is not particularly limited, it is preferable from the stretchability viewpoint to produce the propylene homopolymer (B) using a Ziegler-Natta catalyst. In particular, the propylene homopolymer (B) is preferably obtained by performing polymerization in the presence of an olefin polymerization catalyst containing a solid titanium catalyst component (I), an organometallic compound (II) containing a metal atom selected from the group consisting of group 1, group 2, and group 13 of the periodic table, and optionally an electron donor (III). Below, each component of the olefin polymerization catalyst will now be described in detail.

<Solid Titanium Catalyst Component (I)>

The solid titanium catalyst component (I) preferably contains a titanium compound, a magnesium compound, a halogen, a cyclic ester compound (a) and a cyclic ester compound (b) that are electron donors (I), and optionally a catalyst component (c) that is an electron donor (I). Examples of these compounds include compounds described in, for example, WO2006/077945, WO2006/077946, WO2008/010459, WO2009/069483, and JP7-109314A.

<Titanium Compound>

Examples of the titanium compound include tetravalent titanium compounds represented by the formula below.

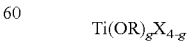

In the above formula, R is a hydrocarbon group, X is a halogen atom, and g is 0≤g≤4.

Specific examples of the titanium compound include titanium tetrahalides such as $TiCl_4$ and $TiBr_4$; alkoxytitanium trihalides such as $Ti(OCH_3)Cl_3$, $Ti(OC_2H_5)Cl_3$, $Ti(O$-$n$-$C_4H_9)Cl_3$, $Ti(OC_2H_5)Br_3$, and $Ti(O$-$isoC_4H_9)Br_3$;

alkoxytitanium dihalides such as Ti(OCH$_3$)$_2$Cl$_2$ and Ti(OC$_2$H$_5$)$_2$Cl$_2$; alkoxytitanium monohalides such as Ti(OCH$_3$)$_3$Cl, Ti(O-n-C$_4$H$_9$)$_3$Cl, and Ti(OC$_2$H$_5$)$_3$Br; and tetraalkoxytitaniums such as Ti(OCH$_3$)$_4$, Ti(OC$_2$H$_5$)$_4$, Ti(OC$_4$H$_9$)$_4$, and Ti(O-2-ethylhexyl)$_4$. Among these, the titanium compound is preferably a titanium tetrahalide, and more preferably titanium tetrachloride. These titanium compounds may be used singly or in combinations of two or more.

<Magnesium Compound>

Specific examples of the magnesium compound include magnesium halides such as magnesium chloride and magnesium bromide; alkoxymagnesium halides such as methoxymagnesium chloride, ethoxymagnesium chloride, and phenoxymagnesium chloride; alkoxymagnesiums such as ethoxymagnesium, isopropoxymagnesium, butoxymagnesium, and 2-ethylhexoxymagnesium; aryloxymagnesiums such as phenoxymagnesium; and carboxylic acid salts of magnesium such as magnesium stearate. These magnesium compounds may be used singly or in combinations of two or more. These magnesium compounds may be complex compounds or double compounds with other metals, or mixtures with other metal compounds.

Among these, the magnesium compound is preferably a magnesium compound containing a halogen, more preferably a magnesium halide, and even more preferably magnesium chloride. An alkoxymagnesium such as ethoxymagnesium is also preferably used. The magnesium compound may be derived from another substance, e.g., one obtained by bringing an organomagnesium compound such as a Grignard reagent into contact with a titanium halide, a silicon halide, an alcohol halide, or the like. For example, in the case of combining an alkoxymagnesium and a tetraalkoxytitanium, it is preferable to bring silicon tetrachloride or the like as a halogenating agent into reaction to form a magnesium halide.

<Halogen>

Examples of the halogen include X as in Ti(OR)$_g$X$_{4-g}$ which is an example of the titanium compound, and the halogen of a magnesium halide which is an example of the magnesium compound. One of these halogens may be used, or two or more may be used in combination.

<Electron Donor (I)>

As the electron donor (I), usable are a cyclic ester compound (a), a cyclic ester compound (b), and, optionally, a catalyst component (c).

<Cyclic Ester Compound (a)>

Examples of the cyclic ester compound (a) include compounds described in, for example, WO2006/077945 and WO2009/069483.

The cyclic ester compound (a) is preferably a compound represented by formula (1a) below.

[Formula 6]

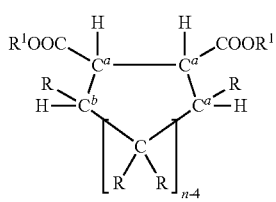

(1a)

In formula (1a) above, n is an integer of 5 to 10, preferably an integer of 5 to 7, and more preferably 6. $C^a$ and $C^b$ represent carbon atoms.

A plurality of $R^1$ are each independently a monovalent hydrocarbon group having 1 to 20, preferably 1 to 10, more preferably 2 to 8, even more preferably 4 to 8, and particularly preferably 4 to 6 carbon atoms. Examples of the hydrocarbon group include a methyl group, an ethyl group, a n-propyl group, an isopropyl group, a n-butyl group, an isobutyl group, a hexyl group, a heptyl group, an octyl group, a 2-ethylhexyl group, a decyl group, a dodecyl group, a tetradecyl group, a hexadecyl group, an octadecyl group, and an eicosyl group. Among these, the hydrocarbon group is preferably a n-butyl group, an isobutyl group, a hexyl group, or an octyl group, and more preferably a n-butyl group or an isobutyl group from the viewpoint of enabling a propylene-based block copolymer having a broad molecular weight distribution to be produced.

A plurality of R are each independently an atom or a group, such as a hydrogen atom, a hydrocarbon group having 1 to 20 carbon atoms, a halogen atom, a nitrogen-containing group, an oxygen-containing group, a phosphorus-containing group, a halogen-containing group, or a silicon-containing group. At least one R is an atom other than a hydrogen atom or a group. The atom other than a hydrogen atom or the group is preferably a hydrocarbon group having 1 to 20 carbon atoms. Examples of the hydrocarbon group having 1 to 20 carbon atoms include aliphatic hydrocarbon groups, alicyclic hydrocarbon groups, and aromatic hydrocarbon groups having 1 to 20 carbon atoms, such as a methyl group, an ethyl group, a n-propyl group, an iso-propyl group, a n-butyl group, an iso-butyl group, a sec-butyl group, a n-pentyl group, a cyclopentyl group, a n-hexyl group, a cyclohexyl group, a vinyl group, a phenyl group, and an octyl group. Among these, the hydrocarbon group having 1 to 20 carbon atoms is preferably an aliphatic hydrocarbon group having 1 to 20 carbon atoms, and more preferably a methyl group, an ethyl group, a n-propyl group, an iso-propyl group, a n-butyl group, an iso-butyl group, or a sec-butyl group.

Single bonds in the ring skeleton (provided that the $C^a$—$C^a$ bonds and the $C^a$—$C^b$ bond are excluded) may be replaced with double bonds. That is to say, the C—C bond (when n is 6 to 10), the $C^a$—C bond, and the $C^b$—C bond in the ring skeleton may be replaced with double bonds.

The compound represented by formula (1a) above is, in particular, preferably diisobutyl 3,6-dimethylcyclohexane-1,2-dicarboxylate, di-n-hexyl 3,6-dimethylcyclohexane-1,2-dicarboxylate, di-n-octyl 3,6-dimethylcyclohexane-1,2-dicarboxylate, diisobutyl 3-methyl-6-ethylcyclohexane-1,2-dicarboxylate, di-n-hexyl 3-methyl-6-ethylcyclohexane-1,2-dicarboxylate, di-n-octyl 3-methyl-6-ethylcyclohexane-1,2-dicarboxylate, diisobutyl 3-methyl-6-n-propylcyclohexane-1,2-dicarboxylate, di-n-hexyl 3-methyl-6-n-propylcyclohexane-1,2-dicarboxylate, di-n-octyl 3-methyl-6-n-propylcyclohexane-1,2-dicarboxylate, diisobutyl 3,6-diethylcyclohexane-1,2-dicarboxylate, di-n-hexyl 3,6-diethylcyclohexane-1,2-dicarboxylate, or di-n-octyl 3,6-diethylcyclohexane-1,2-dicarboxylate. These compounds can be produced by taking advantage of a Diels-Alder reaction.

The cyclic ester compound (a) having a diester structure as described above has isomers such as cis and trans isomers, and although any structure provides an effect that meets the object of the present invention, a structure having a higher trans form content is preferable because there is a tendency that it results in not only a greater effect of broadening the molecular weight distribution but also a higher activity and a higher stereoregularity of the resulting polymer. As for the cis form and the trans form, the proportion of the trans form is preferably 51% or more, more preferably 55% or more, even more preferably 60% or more, and particularly preferably 65% or more. The proportion of the trans form is 100% or less, preferably 90% or less, more preferably 85% or less, and even more preferably 79% or less.

<Cyclic Ester Compound (b)>

Examples of the cyclic ester compound (b) include compounds described in, for example, WO2006/077946 and WO2009/069483.

The cyclic ester compound (b) is preferably a compound having a cycloalkane-1,2-dicarboxylic acid diester structure or a cycloalkene-1,2-dicarboxylic acid diester structure represented by formula (2a) below.

[Formula 7]

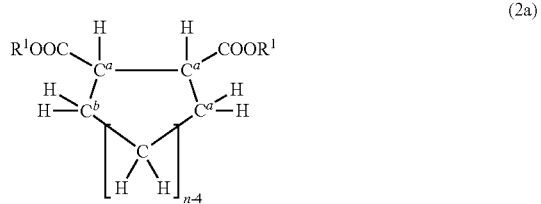

(2a)

In formula (2a) above, n is an integer of 5 to 10, preferably an integer of 5 to 7, and more preferably 6. $C^a$ and $C^b$ represent carbon atoms.

A plurality of $R^1$ are each independently a monovalent hydrocarbon group having 1 to 20, preferably 1 to 10, more preferably 2 to 8, even more preferably 4 to 8, and particularly preferably 4 to 6 carbon atoms. Examples of the hydrocarbon group include a methyl group, an ethyl group, a n-propyl group, an isopropyl group, a n-butyl group, an isobutyl group, a hexyl group, a heptyl group, an octyl group, a 2-ethylhexyl group, a decyl group, a dodecyl group, a tetradecyl group, a hexadecyl group, an octadecyl group, and an eicosyl group. Among these, the hydrocarbon group is preferably a n-butyl group, an isobutyl group, a hexyl group, or an octyl group, and more preferably a n-butyl group or an isobutyl group from the viewpoint of enabling a propylene-based block copolymer having a broad molecular weight distribution to be produced.

Single bonds in the ring skeleton (provided that the $C^a$—$C^a$ bonds and the $C^a$—$C^b$ bond are excluded, i.e., the C—$C^a$ bond, the C—$C^b$ bond, and the C—C bond (when n is 6 to 10)) may be replaced with double bonds.

Among these, the compound represented by formula (2a) above is preferably diisobutyl cyclohexane-1,2-dicarboxylate, dihexyl cyclohexane-1,2-dicarboxylate, diheptyl cyclohexane-1,2-dicarboxylate, dioctyl cyclohexane-1,2-dicarboxylate, or di-2-ethylhexyl cyclohexane-1,2-dicarboxylate. This is because these compounds not only have a high catalytic performance but also can be produced relatively inexpensively by taking advantage of a Diels-Alder reaction.

The cyclic ester compound (b) having a diester structure as described above has isomers such as cis and trans isomers, and any structure provides an effect that meets the object of the present invention. As for the cis form and the trans form, the proportion of the trans form is preferably 51% or more, more preferably 55% or more, even more preferably 60% or more, and particularly preferably 65% or more. The proportion of the trans form is 100% or less, preferably 90% or less, more preferably 85% or less, and even more preferably 79% or less. Although the reason therefor is not clear, it is conjectured that the variation of stereoisomers described below is within a range suitable for broadening the molecular weight distribution.

In particular, in the case of cyclohexane-1,2-dicarboxylic acid diester of formula (2a) above wherein n=6, the purity of the trans form is preferably within the above range. When the purity of the trans form is less than 51%, the molecular weight distribution broadening effect, activity, stereospecificity, and the like may be insufficient. When the purity of the trans form exceeds 79%, the molecular weight distribution broadening effect may be insufficient. On the other hand, a purity of the trans form within the above range is often advantageous to simultaneously achieving both the effect of broadening the molecular weight distribution of the resulting polymer, catalyst activity, and increased stereoregularity of the resulting polymer at a high level.

One cyclic ester compound (a) may be used, or two or more may be used in combination. Also, one cyclic ester compound (b) may be used, or two or more may be used in combination.

The proportion of the cyclic ester compound (a) relative to the sum of the cyclic ester compound (a) and the cyclic ester compound (b) (cyclic ester compound (a)/(cyclic ester compound (a)+cyclic ester compound (b))×100 (mol %)) is preferably 10 mol % or more, more preferably 30 mol % or more, even more preferably 40 mol % or more, and particularly preferably 50 mol % or more. This proportion is preferably 99 mol % or less, more preferably 90 mol % or less, even more preferably 85 mol % or less, and particularly preferably 80 mol % or less.

Even when the content of the cyclic ester compound (a) in the solid titanium catalyst component (I) is low, the solid titanium catalyst component (I) can yield with high activity a propylene polymer having an extremely broad molecular weight distribution and high stereoregularity. Although the cause of this effect is not clear, it is conjectured by the present inventors as follows.

Due to the presence of substituent R, the cyclic ester compound (a) has a significantly larger variety of stereo structures that can be formed than the cyclic ester compound (b). Accordingly, it is considered that the influence of the cyclic ester compound (a) on the molecular weight distribution is dominant, and a propylene polymer having an extremely broad molecular weight distribution can be yielded even when the proportion of the cyclic ester compound (a) is low. On the other hand, having relatively similar structures, the cyclic ester compound (a) and the cyclic ester compound (b) are unlikely to mutually influence the effects of the compounds with respect to fundamental properties such as activity and stereoregularity (there are many cases where activity, stereoregularity, and the like are drastically changed, or the effect of one compound becomes dominant, when compounds with different structures are used).

The cyclic hydrocarbon structure is known to form a large variety of stereo structures such as a chair conformation and a boat conformation. Furthermore, when the cyclic hydrocarbon structure has a substituent, the variation of possible stereo structures is further increased. Also, when the bonding between a carbon atom to which an ester group ($COOR^1$) is bonded and another carbon atom to which an ester group ($COOR^1$) is bonded among the carbon atoms forming the ring skeleton of the cyclic ester compound is a single bond, the variation of possible stereo structures is increased. This capability of taking a large variety of stereo structures leads to the formation of a large variety of active species on the solid titanium catalyst component (I). As a result, polymerizing propylene using the solid titanium catalyst component (I) makes it possible to produce at once propylene polymers having various molecular weights, or that is to say, makes it possible to produce a propylene-based block copolymer having a broad molecular weight distribution.

The cyclic ester compounds (a) and (b) may be formed during the process of preparing the solid titanium catalyst component (I). For example, when preparing the solid titanium catalyst component (I), providing a step of bringing anhydrous carboxylic acids or carboxylic acid dihalides corresponding to the cyclic ester compounds (a) and (b) substantively into contact with corresponding alcohols makes it possible to cause the cyclic ester compounds (a) and (b) to be contained in the solid titanium catalyst component (I).

<Catalyst Component (c)>

Examples of the catalyst component (c) include ether compounds and polyvalent carboxylic acid esters described in, for example, JP7-109314A.

Among these, a compound (c1) having two or more ether bonds via a plurality of atoms is preferably a 1,3-diether and more preferably 2-isopropyl-2-isobutyl-1,3-dimethoxypropane, 2,2-diisobutyl-1,3-dimethoxypropane, 2-isopropyl-2-isopentyl-1,3-dimethoxypropane, 2,2-dicyclohexyl-1,3-dimethoxypropane, and 2,2-bis(cyclohexylmethyl)1,3-dimethoxypropane.

Moreover, among these compounds, the polyvalent carboxylic acid ester is preferably an aromatic polycarboxylic acid ester and more preferably a phthalic acid ester.

The catalyst component (c) which is an electron donor component shows the effect of increasing the stereoregularity of the resulting polymer, the effect of controlling the compositional distribution of the resulting copolymer, the agglomerating-agent effect of controlling the particle shape and the particle diameter of catalyst particles, and like effects, while maintaining high catalytic activity. Moreover, the cyclic ester compounds (a) and (b) are considered to further have the effect of controlling the molecular weight distribution as well.

<Method for Preparing Solid Titanium Catalyst Component (I)>

The method for preparing the solid titanium catalyst component (I) is not particularly limited as long as the solid titanium catalyst component (I) contains the above titanium compound, the above magnesium compound, a halogen, and the above electron donor (I). The solid titanium catalyst component (I) can be preferably prepared, for example, by methods (P-1) to (P-4) below:

(P-1) A method in which a solid adduct containing a magnesium compound and a solubilizing component, an electron donor (I), and a liquid titanium compound are brought into contact in a suspended state in the concomitant presence of an inert hydrocarbon solvent;

(P-2) A method in which a solid adduct containing a magnesium compound and a solubilizing component, an electron donor (I), and a liquid titanium compound are brought into contact in several divided portions;

(P-3) A method in which a solid adduct containing a magnesium compound and a solubilizing component, an electron donor (I), and a liquid titanium compound are brought into contact in a suspended state in the concomitant presence of an inert hydrocarbon solvent and brought into contact in several divided portions; and (P-4) A method in which a liquid magnesium compound containing a magnesium compound and a solubilizing component, a liquid titanium compound, and an electron donor (I) are brought into contact.

The temperature when preparing the solid titanium catalyst component (I) is preferably −30° C. to 150° C., more preferably −25° C. to 140° C., and even more preferably −25 to 130° C.

The solid titanium catalyst component (I) can also be prepared in the presence of a solvent as necessary. Examples of the solvent include polar aromatic hydrocarbons such as toluene, aliphatic hydrocarbons such as heptane, hexane, octane, decane, and cyclohexane, and alicyclic hydrocarbon compounds. Among these, the solvent is preferably an aliphatic hydrocarbon.

A polymerization reaction of propylene using the solid titanium catalyst component (I) produced under these conditions results in a polymer having a broad molecular weight distribution. Moreover, a high catalytic activity is exerted, and the stereoregularity of the resulting polymer is high.

<Solubilizing Component>

The solubilizing component is preferably a compound capable of solubilizing the magnesium compound in a temperature range of from room temperature to about 300° C. Examples of the compound include alcohols, aldehydes, amines, carboxylic acids, and mixtures thereof.

Specific examples of the alcohols include aliphatic alcohols such as methanol, ethanol, propanol, butanol, isobutanol, ethylene glycol, 2-methylpentanol, 2-ethylbutanol, n-heptanol, n-octanol, 2-ethylhexanol, decanol, and dodecanol; alicyclic alcohols such as cyclohexanol and methyl cyclohexanol; aromatic alcohols such as benzyl alcohol and methylbenzyl alcohol; and aliphatic alcohols having an alkoxy group, such as n-butylcellosolve.

Examples of the aldehydes include aldehydes having 7 or more carbon atoms, such as capric aldehyde and 2-ethylhexylaldehyde.

Examples of the amines include amines having 6 or more carbon atoms, such as heptylamine, octylamine, nonylamine, laurylamine, and 2-ethylhexylamine.

Examples of the carboxylic acids include organic carboxylic acids having 7 or more carbon atoms, such as capric acid and 2-ethylhexanoic acid.

Among these, the solubilizing component is preferably an above alcohol and more preferably ethanol, propanol, butanol, isobutanol, hexanol, 2-ethylhexanol, or decanol. One of these solubilizing components may be used, or two or more may be used in combination.

Although the amounts of the magnesium compound and the solubilizing component used when preparing the solid adduct and the liquid magnesium compound vary depending on their kinds, contact conditions, and the like, the magnesium compound is used in an amount of 0.1 to 20 mol/liter and preferably 0.5 to 5 mol/liter per unit volume of the solubilizing component. Optionally, it is also possible to use in combination a solvent that is inert to the solid adduct. For example, a hydrocarbon compound such as heptane, hexane, octane, or decane is preferably used as the solvent.

Although it is not possible to generally specify the compositional ratio of the solubilizing component to the resulting solid adduct or to magnesium of the liquid magnesium compound because the ratio also varies depending on the kind of the compound used, the amount of the solubilizing component per mol of magnesium in the magnesium compound is in the range of preferably 2.0 mol or more, more preferably 2.2 mol or more, even more preferably 2.3 mol or more, and particularly preferably 2.4 mol or more, and 5.0 mol or less.

In the solid titanium catalyst component (I), halogen/titanium (atomic ratio) (i.e., the number of moles of halogen atom/the number of moles of titanium atom) is preferably 2 to 100 and more preferably 4 to 90. Cyclic ester compound (a)/titanium (molar ratio) (i.e., the number of moles of cyclic ester compound (a)/the number of moles of titanium atom) and cyclic ester compound (b)/titanium (molar ratio) (i.e., the number of moles of cyclic ester compound (b)/the number of moles of titanium atom) are preferably 0.01 to 100 and more preferably 0.2 to 10. Solubilizing component/titanium atom (molar ratio) is preferably 0 to 100 and more preferably 0 to 10.

As for a preferable ratio of the cyclic ester compound (a) to the cyclic ester compound (b), the lower limit of the value (mol %) of 100×cyclic ester compound (a)/(cyclic ester compound (a)+cyclic ester compound (b)) is preferably 5 mol %, more preferably 25 mol %, even more preferably 40 mol %, and particularly preferably 50 mol %. The upper limit of the value is preferably 99 mol %, more preferably 90 mol %, even more preferably 85 mol %, and particularly preferably 80 mol %.

Magnesium/titanium (atomic ratio) (i.e., the number of moles of magnesium atom/the number of moles of titanium atom) is preferably 2 to 100 and more preferably 4 to 50.

The content of components that may be contained other than the cyclic ester compounds (a) and (b), such as the solubilizing component and the catalyst component (c), is preferably 20% by mass or less and more preferably 10% by mass or less per 100% by mass of the cyclic ester compounds (a) and (b).

<Organometallic Compound (II)>

The organometallic compound (II) is an organometallic compound containing a metal atom selected from the group consisting of group 1, group 2, and group 13 of the periodic table. Specifically, a compound containing a group 13 metal, such as an organoaluminum compound or an alkyl complex compound of a group 1 metal and aluminum, an organometallic compound of a group 2 metal, or the like is usable as the organometallic compound (II). Among these, the organometallic compound (II) is preferably an organoaluminum compound.

<Electron Donor (III)>

The olefin polymerization catalyst may optionally contain an electron donor (III). The electron donor (III) is preferably an organosilicon compound. Examples of the organosilicon compound include compounds represented by formula (5) below.

$$R_nSi(OR')_{4-n} \quad (5)$$

In formula (5) above, R and R' are hydrocarbon groups, and n is an integer of 0<n<4.

Among these, the compounds represented by formula (5) above are preferably vinyltriethoxysilane, diphenyldimethoxysilane, dicyclohexyldimetoxysilane, cyclohexylmethyldimethoxysilane, and dicyclopenthyldimethoxysilane.

A compound represented by formula (6) below is also preferable as the organosilicon compound.

$$Si(OR^a)_3(NR^bR^c) \quad (6)$$

In formula (6) above, $R^a$ is a hydrocarbon group having 1 to 6 carbon atoms, preferably an unsaturated or saturated aliphatic hydrocarbon group having 1 to 6 carbon atoms, and more preferably a saturated aliphatic hydrocarbon group having 2 to 6 carbon atoms. Specific examples of $R^a$ include a methyl group, an ethyl group, a n-propyl group, an iso-propyl group, a n-butyl group, an iso-butyl group, a sec-butyl group, a n-pentyl group, an iso-pentyl group, a cyclopentyl group, a n-hexyl group, and a cyclohexyl group. Among these, $R^a$ is preferably an ethyl group.

In formula (6) above, $R^b$ is a hydrocarbon group having 1 to 12 carbon atoms or a hydrogen atom, and is preferably an unsaturated or saturated aliphatic hydrocarbon group having 1 to 12 carbon atoms or a hydrogen atom. Specific examples of $R^b$ include a hydrogen atom, a methyl group, an ethyl group, a n-propyl group, an iso-propyl group, a n-butyl group, an iso-butyl group, a sec-butyl group, a n-pentyl group, an iso-pentyl group, a cyclopentyl group, a n-hexyl group, a cyclohexyl group, and an octyl group. Among these, $R^b$ is preferably an ethyl group.

In formula (6) above, $R^c$ is a hydrocarbon group having 1 to 12 carbon atoms or a hydrogen atom, and is preferably an unsaturated or saturated aliphatic hydrocarbon group having 1 to 12 carbon atoms. Specific examples of $R^c$ include a methyl group, an ethyl group, a n-propyl group, an iso-propyl group, a n-butyl group, an iso-butyl group, a sec-butyl group, a n-pentyl group, an iso-pentyl group, a cyclopentyl group, a n-hexyl group, a cyclohexyl group, and an octyl group. Among these, $R^c$ is preferably an ethyl group.

Specific examples of the compound represented by formula (6) above include dimethylaminotriethoxysilane, diethylaminotriethoxysilane, dimethylaminotrimethoxysilane, diethylaminotrimethoxysilane, diethylaminotri-n-propoxysilane, di-n-propylaminotriethoxysilane, methyl-n-propylaminotriethoxysilane, t-butylaminotriethoxysilane, ethyl-n-propylaminotriethoxysilane, ethyl-iso-propylaminotriethoxysilane, and methylethylaminotriethoxysilane. One of these may be used, or two or more may be used in combination.

Other examples of the organosilicon compound include compounds represented by formula (7) below.

$$RNSi(OR^a)_3 \quad (7)$$

In formula (7) above, RN is a cyclic amino group. Examples of the cyclic amino group include a perhydroquinolino group, a perhydroisoquinolino group, a 1,2,3,4-tetrahydroquinolino group, a 1,2,3,4-tetrahydroisoquinolino group, and an octamethyleneimino group. IV is the same as in formula (6) above.

Specific examples of the compounds represented by formula (7) above include (perhydroquinolino)triethoxysilane, (perhydroisoquinolino)triethoxysilane, (1,2,3,4-tetrahydroquinolino)triethoxysilane, (1,2,3,4-tetrahydroisoquinolino)triethoxysilane, and octamethyleneiminotriethoxysilane. One of these may be used, or two or more may be used in combination.

As for the various kinds of components, such as electron donors, of the solid titanium catalyst component, one of each kind may be used, and two or more can be used in combination.

<Production Conditions of Propylene Homopolymer (B)>

The propylene homopolymer (B) is preferably produced by performing main polymerization in the presence of a pre-polymerized catalyst obtained by pre-polymerizing propylene in the presence of the olefin polymerization catalyst. The pre-polymerization is performed by pre-polymerizing propylene preferably in an amount of 0.1 to 1000 g, more preferably 0.3 to 500 g, and even more preferably 1 to 200 g per gram of the olefin polymerization catalyst.

In pre-polymerization, a catalyst can be used in a concentration higher than the catalyst concentration in the system of main polymerization. The concentration of the solid titanium catalyst component (I) in pre-polymerization, in terms of titanium atom, is preferably 0.001 to 200 mmol, more preferably 0.01 to 50 mmol, and even more preferably 0.1 to 20 mmol per liter of solvent.

It is sufficient that the amount of the organometallic compound (II) in pre-polymerization is an amount such that preferably 0.1 to 1000 g and more preferably 0.3 to 500 g of a polymer is produced per gram of the solid titanium catalyst component (I). Specifically, the amount of the organometallic compound (II) is preferably 0.1 to 300 mol, more preferably 0.5 to 100 mol, and even more preferably 1 to 50 mol per mol of titanium atoms in the solid titanium catalyst component (I).

In pre-polymerization, the electron donor (III) and the like can be used as necessary. At this time, the amount of these components is preferably 0.1 to 50 mol, more preferably 0.5 to 30 mol, and even more preferably 1 to 10 mol per mol of titanium atoms in the solid titanium catalyst component (I).

Pre-polymerization can be performed, for example, under mild conditions after adding propylene and the catalyst component to an inert hydrocarbon medium. Specific examples of the inert hydrocarbon medium include aliphatic hydrocarbons such as propane, butane, pentane, hexane, heptane, octane, decane, dodecane, and kerosene; alicyclic hydrocarbons such as cyclopentane, methylcyclopentane, cyclohexane, cycloheptane, methylcycloheptane, and cyclooctane; aromatic hydrocarbons such as benzene, toluene, and xylene; halogenated hydrocarbons such as ethylenechloride and chlorobenzene; and mixtures thereof. Among these inert hydrocarbon media, an aliphatic hydrocarbon is preferable. In the case of using an inert hydrocarbon medium as above, it is preferable to perform pre-polymerization in a batch-wise manner.

On the other hand, it is also possible to perform pre-polymerization using propylene itself as a solvent, and it is also possible to perform pre-polymerization in a substantially solvent-free state. In this case, it is preferable to perform pre-polymerization in a continuous manner. The temperature of pre-polymerization is preferably −20 to 100° C., more preferably −20 to 80° C., and even more preferably 0 to 40° C.

Next, main polymerization will now be described, which is performed via the pre-polymerization or not via the pre-polymerization. The main polymerization is the step of producing the propylene homopolymer (B).

Pre-polymerization and main polymerization can be performed by any of liquid-phase polymerization methods such as bulk polymerization, solution polymerization and suspension polymerization, and gas-phase polymerization methods. Among these, liquid-phase polymerization such as bulk polymerization or suspension polymerization, or gas-phase polymerization is preferable.

When main polymerization takes the reaction form of slurry polymerization, an inert hydrocarbon as used during the above-described pre-polymerization is usable as a reaction solvent. Propylene, which is liquid at the reaction temperature and pressure, is usable as well.

In main polymerization, the amount of the solid titanium catalyst component (I), in terms of titanium atom, is preferably 0.0001 to 0.5 mmol and more preferably 0.005 to 0.1 mmol per liter of the polymerization volume. The amount of the organometallic compound (II) is preferably 1 to 2000 mol and more preferably 5 to 500 mol per mol of titanium atoms in the pre-polymerized catalyst component in the polymerization system. In the case of using the electron donor (III), the amount of the electron donor (III) is preferably 0.001 to 50 mol, more preferably 0.01 to 30 mol, and even more preferably 0.05 to 20 mol per mol of the organometallic compound (II).

Performing main polymerization in the presence of hydrogen makes it possible to adjust (reduce) the molecular weight of the resulting polymer, and yields a polymer having a high melt flow rate (MFR). The range of the amount of hydrogen necessary for adjusting the molecular weight cannot be generally specified because it varies depending on the type of the production process used, pressure, and temperature. Accordingly, it is preferable to determine the amount of hydrogen in consideration of pressure and temperature such that a propylene homopolymer (B) having an MFR that is within the intended range is obtained.

In main polymerization, the polymerization temperature of propylene is preferably 20 to 200° C., more preferably 30 to 100° C., and even more preferably 50 to 90° C. The pressure (gauge pressure) is preferably from normal pressure to 100 kgf/cm$^2$ (9.8 MPa) and more preferably 2 to 50 kgf/cm$^2$ (0.20 to 4.9 MPa).

The propylene homopolymer (B) is used as a raw material of a capacitor film, and thus when the amount of the polymer produced per unit amount of catalyst is small, it is possible to remove catalyst residues by performing after-treatment. Even when the amount of the polymer produced is large due to high catalytic activity, it is preferable to perform after-treatment to remove catalyst residues.

An example of a method of the after-treatment is washing the resulting propylene homopolymer (B) with liquid propylene, butane, hexane, heptane, or the like. At this time, water, an alcohol compound, a ketone compound, an ether compound, an ester compound, an amine compound, an organic acid compound, an inorganic acid compound, or the like may be added to solubilize catalyst components such as titanium and magnesium to make it easy to perform extraction. Washing with a polar compound such as water or alcohol is also preferable. By performing such after-treatment, the chlorine content in the resulting propylene homopolymer (B) can be reduced.

<Method for Preparing Propylene Homopolymer Composition>

An example of the method for preparing a propylene homopolymer composition of the present invention is mixing the propylene homopolymer (A) in a powder or pellet form, the propylene homopolymer (B), and optionally other additives by a dry blender, a Henschel mixer, or the like. Also, these raw materials may be melt-kneaded in advance by a uniaxial or biaxial kneading machine, a kneader, or the like. Examples of other additives include stabilizers such as antioxidants and chlorine absorbents, lubricants, plasticizers, flame retardants, and antistatic agents. These additives can be added as long as the effects of the present invention are not impaired.

<Capacitor Film>

The capacitor film of the present invention is composed of the propylene homopolymer composition of the present invention. The thickness of the capacitor film of the present invention is 1 to 50 μm, preferably 1.5 to 30 μm, more preferably 1.5 to 20 μm, even more preferably 2 to 15 μm, and particularly preferably 2 to 4 μm. When the thickness is less than 1 μm, the film is likely to break, and the film productivity is decreased. On the other hand, when the thickness exceeds 50 μm, it is not possible to reduce the capacitor size and, also, capacitance is small. In particular, the thickness dependency of the high-temperature voltage resistance of the capacitor film of the present invention is small and, therefore, significant effects on high-temperature voltage resistance are obtained in the case of a thin film having a thickness of 4 μm or less.

The capacitor film of the present invention is a film obtained by stretching the propylene homopolymer composition at an area stretch ratio (area ratio of length×width) of 30 to 80, preferably 35 to 75, more preferably 35 to 70, and even more preferably 35 to 50. When the area stretch ratio is 30 or more, the size of crystals inside a film is small, and a film having a higher dielectric breakdown strength can be obtained.

Normally, the higher the temperature during use and the thinner the capacitor film is, the lower the withstand voltage tends to be. However, since a propylene homopolymer composition that satisfies specific requirements is used in the capacitor film of the present invention, the thin film of the present invention is characterized by high voltage resistance even when the temperature during use is high.

The high-temperature withstand voltage of the capacitor film of the present invention is preferably 0.90 kV or more, and more preferably 1.0 kV or more, for example, when the film has a thickness of 3.0 μm. The film thickness dependency of high-temperature withstand voltage is preferably 0.35 kV/μm or less, more preferably 0.30 kV/μm or less, and even more preferably 0.25 kV/μm or less. This is because the reduction of withstand voltage is small even when the film is made thin. Here, the high-temperature withstand voltage is a value of withstand voltage (BDV) obtained by the measurement method provided in the Examples described below, and the temperature is set to 120° C. The film thickness dependency of high-temperature withstand voltage is a value of the thickness dependency of dielectric breakdown voltage (dBDV/dL) obtained by the measurement method provided in the Examples described below.

The capacitor film of the present invention is preferably used as a capacitor separator film to be interposed between the electrodes of a capacitor. That is to say, the present invention includes the use of the capacitor film of the present invention as a capacitor separator film.

<Method for Producing Capacitor Film>

The capacitor film of the present invention is obtained by, for example, producing a primary sheet and then stretching the sheet.

For example, the following method can be employed as a method for producing a primary sheet. As described above, it is possible to produce a propylene homopolymer composition by melt-kneading raw materials in advance, and use this propylene homopolymer composition as a raw material. It is also possible to use a dry blend of the propylene homopolymer (A) and the propylene homopolymer (B), to which various additives such as various antioxidants (such as Irganox 1010 (trade name, manufactured by BASF), BHT (dibutylhydroxytoluene), and Irgafos 168 (trade name, manufactured by BASF) and calcium stearate are further added as necessary.

The propylene homopolymer composition is supplied to an extruder from a hopper, thermally melted at 170 to 300° C. and preferably 200 to 260° C., and melt-extruded from a T-die. Then, this composition is cooled to solidify by a metal chill roll at 70 to 120° C., thus yielding an unstretched primary sheet. The thickness of the primary sheet is not particularly limited, and is preferably 60 to 800 μm and more preferably 80 to 400 μm. When the thickness of the primary sheet is less than 60 μm, the sheet may break during stretching. When the thickness exceeds 800 μm, a thin film cannot be obtained and, therefore, such a sheet may not be suitable for a capacitor film.

A capacitor film may be produced by stretching the primary sheet. Examples of stretching methods include uniaxial stretching methods and biaxial stretching methods, and biaxial stretching methods are preferable. Examples of biaxial stretching methods include sequential biaxial stretching methods in which a film is uniaxially stretched in the machine direction and then stretched in a direction perpendicular to the machine direction, and simultaneous biaxial stretching methods in which stretching is performed simultaneously in the machine direction and in a direction perpendicular thereto. Specifically, sequential biaxial stretching methods such as a tenter method and a tubular film method as well as simultaneous biaxial stretching methods are usable.

A tenter method can be performed, for example, in the following manner. A molten sheet that has been melt-extruded from a T-die is solidified by a chill roll, and the sheet is introduced into a stretching zone after preheated as needed. Then, the sheet is stretched to 3 to 9 times in the machine direction (longitudinal direction) at a temperature of 120 to 160° C., and stretched to 5 to 11 times in a direction perpendicular to the machine direction (transverse direction) at a temperature of 150 to 190° C. The total area stretch ratio is 30 to 80, preferably 35 to 75, more preferably 35 to 70, and even more preferably 40 to 50. Optionally, it is also possible to subject the biaxially stretched film to heat setting at 160 to 190° C. Accordingly, a film can be obtained that has more enhanced thermal dimensional stability, abrasion resistance, and the like.

EXAMPLES

The present invention will now be described in more detail below by way of Examples, but the present invention is not limited thereto. Various properties of propylene homopolymers and propylene homopolymer compositions used in Examples and Comparative Examples were measured as follows.

(1) Melt Flow Rate (MFR)

The melt flow rate (MFR) was measured at 230° C. under a load of 2.16 kg in accordance with ASTM D1238.

(2) Mesopentad Fraction (mmmm)

The mesopentad fraction (mmmm) of a propylene homopolymer is a value determined by assignment as set forth by A. Zambelli et al., Macromolecules, 8,687 (1975), and was measured by $^{13}$C-NMR under the following conditions. The mesopentad fraction is a value represented by the following formula.

Mesopentad fraction=(Peak area at 21.7 ppm)/(Peak area at 19 to 23 ppm)

<Measurement Conditions>

Apparatus JNM-Lambada 400 (trade name, manufactured by JEOL Ltd.)

Resolution 400 MHz

Measurement temperature125° C.

Solvent 1,2,4-Trichlorobenzene/deuterated benzene=7/4 (mass ratio)

Pulse width 7.8 μsec

Pulse interval 5 sec

Cumulative number 2000 times

Shift standard TMS=0 ppm

Mode Single-pulse broadband decoupling (3) Half Width of Elution Peak

A sample was dissolved by being stirred for 60 minutes in o-dichlorobenzene (300 ppm, containing BHT) at 160° C., and then left to stand still at 95° C. for 45 minutes. This solution was introduced into a TREF column at 95° C., then cooled to −20° C. at a cooling rate of 0.5° C./min, and then heated to 140° C. at a heating rate of 1.0° C./min to obtain an elution curve. The temperature width located at the height that is half the height of the elution peak obtained from the resulting elution curve was calculated, and the value thereof was regarded as the half width of the elution peak. Measurement conditions are as follows.

<Measurement Conditions>

Apparatus Temperature rising elution fractionation apparatus TREF 200+(trade name, manufactured by Polymer ChAR)

Eluant o-Dichlorobenzene (300 ppm, containing BHT)

Sample concentration 0.40% (w/v)

Injection volume 0.3 mL (4) Molecular Weight Distribution (Mw/Mn)

Measurement was performed under the following conditions, and the resulting chromatogram was analyzed to calculate the Mw/Mn of a propylene homopolymer. The molecular weight was calculated by a universal calibration method to find a value in terms of polystyrene. As for the baseline of a GPC chromatogram, the retention time at which the elution curve rises was regarded as the starting point, and the retention time corresponding to a molecular weight of 1000 was regarded as the end point.

<Measurement Conditions>

Liquid chromatograph: ALC/GPC 150-C Plus (trade name, a differential refractometer detector integral type, manufactured by Waters)

Columns: GMH6-HT (trade name, manufactured by Tosoh Corporation)×2 and GMH6-HTL (trade name, manufactured by Tosoh Corporation)×2 connected in series Mobile phase medium: o-Dichlorobenzene Flow rate: 1.0 mL/min Measurement temperature: 140° C.

Sample concentration: 0.10% (W/W)

Amount of sample solution: 500 µL (5) Chlorine Content

A burner manufactured by Mitsubishi Kasei Corporation was used to burn 0.8 g of a sample at 400 to 900° C. in an argon/oxygen stream. Then, the combustion gas was captured by ultrapure water, and the sample solution after being concentrated was subjected to a DIONEX-DX300 ion chromatogram (trade name, manufactured by Nippon Dionex) and an anion column AS4A-SC (trade name, manufactured by Nippon Dionex) to measure the chlorine content.

(6) Proportions of Heterologous Bonds Based on 2,1-Insertion and 1,3-Insertion

Using $^{13}$C-NMR, the proportions of 2,1-insertion and the proportion of 1,3-insertion of propylene monomers in all propylene constituting units were measured in accordance with the method described in JP7-145212A.

(7) Withstand Voltage (BDV)

Examples 1 to 10 and Comparative Examples 1 to 10

The BDVs of the resulting films were measured in accordance with JIS-C 2330. The measurement temperature was set to 120° C. Primary films having 3 different thicknesses of 120 µm, 150 µm, and 170 µm were subjected to sequential biaxial stretching to be stretched to 5 times in the longitudinal direction (machine direction) and 9 times in the transverse direction (area stretch ratio: 45) to prepare films having 3 different thicknesses in the range of 2.5 to 4.0 µm, and the withstand voltage of each film was measured. The dielectric breakdown voltage [kV] when the thickness was 3 µm and the thickness dependency of dielectric breakdown voltage (dBDV/dL [kV/µm]) were calculated by the least-squares method from each withstand voltage and film thickness.

Reference Examples 1 and 2

The BDVs of the resulting stretched films were measured in accordance with JIS-C 2330. The measurement temperature was set to 120° C. Primary films having a thickness of 150 µm, 175 µm, or 200 µm were subjected to sequential biaxial stretching to be stretched to 5 times in the longitudinal direction (machine direction) and to 7 times in the transverse direction (area stretch ratio: 35) to prepare films having 3 different thicknesses of more than 4.0 µm and 6.0 µm or less, and the withstand voltage of each film was measured. The dielectric breakdown voltage [kV] when the thickness was 5.0 µm was calculated by the least-squares method from each withstand voltage and film thickness.

Production Examples of Propylene Homopolymers

Production Example 1

Production of Propylene Homopolymer (PP1)

(1) Production of Solid Catalyst Carrier

SiO$_2$ (trade name: Sunsphere H121, manufactured by AGC Si-Tech Co., Ltd.) in an amount of 300 g was sampled into a 1 L sidearm flask and slurried by adding 800 mL of toluene. Next, the slurry was transferred to a 5 L four-neck flask, and 260 mL of toluene was added. A 2830 mL methylaluminoxane (hereinafter referred to as MAO)-toluene solution (10% by mass solution) was added. While maintaining room temperature, stirring was performed for 30 minutes. The temperature was raised to 110° C. in 1 hour, and a reaction was carried out for 4 hours. After the end of reaction, the temperature was lowered to room temperature. After cooling, supernatant toluene was removed, and toluene was newly added for replacement until the percentage of replacement reached 95%.

(2) Production of Solid Catalyst (Supporting Metal Catalyst Component onto Carrier)

In a glove box, 1.0 g of [3-(1',1',4',4',7',7',10',10'-octamethyloctahydrodibenzo[b,h]fluorenyl)(1,1,3-trimethyl-5-tert-butyl-1,2,3,3a-tetrahydropentalene)]zirconium dichloride was weighed into a 5 L four-neck flask. The flask was taken out, 0.5 L of toluene and 2.0 L (100 g in terms of solid component) of the MAO/SiO$_2$/toluene slurry prepared in (1) above were added under nitrogen, and stirring was performed for 30 minutes for supporting. The resulting [3-(1',1',4',4',7',7',10',10'-octamethyloctahydrodibenzo[b,h]fluorenyl)(1,1,3-trimethyl-5-tert-butyl-1,2,3,3a-tetrahydropentalene)]zirconium dichloride/MAO/SiO$_2$/toluene slurry was subjected to 99% replacement with n-heptane such that the final amount of the slurry was 4.5 liters. This procedure was performed at room temperature.

(3) Production of Pre-Polymerized Catalyst

A stirrer-equipped autoclave having an inner volume of 200 L was charged with 101 g of the solid catalyst component prepared in (2) above, 111 mL of triethylaluminum, and 80 L of heptane, the inner temperature was maintained at 15 to 20° C., 303 g of ethylene was added, and a reaction was carried out for 180 minutes while performing stirring.

After the end of polymerization, solid components were allowed to precipitate, and supernatant removal and heptane washing were performed twice. The resulting pre-polymerized catalyst was re-suspended in purified heptane so that the solid catalyst component concentration was adjusted by heptane to 1 g/L. This pre-polymerized catalyst contained 3 g of polyethylene per gram of the solid catalyst component.

(4) Main Polymerization

To a jacketed circulating tubular polymerizer having an inner volume of 58 L were continuously supplied 30 kg/h of propylene, 5 NL/h of hydrogen, 3.2 g/h of the slurry of pre-polymerized catalyst produced in (3) above as a solid catalyst component, and 1.0 ml/h of triethylaluminum, and polymerization was performed, with the polymerizer being completely filled so that there was no vapor phase present. The temperature of the tubular polymerizer was 30° C., and the pressure was 3.1 MPa/G.

The resulting slurry was sent to a stirrer-equipped vessel polymerizer having an inner volume of 1000 L to further perform polymerization. To the polymerizer were supplied 50 kg/h of propylene as well as hydrogen such that the hydrogen concentration of the vapor phase portion was 0.10 mol %. Polymerization was performed at a polymerization temperature of 70° C. under a pressure of 3.0 MPa/G. The resulting slurry was sent to a stirrer-equipped vessel polymerizer having an inner volume of 500 L to further perform polymerization. To the polymerizer were supplied 15 kg/h of propylene as well as hydrogen such that the hydrogen concentration of the vapor phase portion was 0.10 mol %. Polymerization was performed at a polymerization temperature of 69° C. under a pressure of 2.9 MPa/G. Moreover, the resulting slurry was sent to a stirrer-equipped vessel polymerizer having an inner volume of 500 L to further perform polymerization. To the polymerizer were supplied 12 kg/h of propylene as well as hydrogen such that the hydrogen concentration of the vapor phase portion was 0.10 mol %. Polymerization was performed at a polymerization temperature of 68° C. under a pressure of 2.9 MPa/G. Finally, the resulting slurry was sent to a stirrer-equipped vessel polymerizer having an inner volume of 500 L to further perform polymerization. To the polymerizer were supplied 13 kg/h of propylene as well as hydrogen such that the hydrogen concentration of the vapor phase portion was 0.10 mol %. Polymerization was performed at a polymerization temperature of 67° C. under a pressure of 2.9 MPa/G, and a slurry was obtained at 40 kg/h.

The resulting slurry was vaporized, then subjected to gas-solid separation, introduced into a conical dryer, and vacuum-dried at 80° C.

Characteristics of the propylene homopolymer (PP1) obtained as above are shown in Table 1 below. PP1 does not contain a propylene-ethylene copolymer.

Production Example 2

Production of Propylene Homopolymer (PP2)

(1) Production of Solid Catalyst Carrier

A stirrer-equipped pressure vessel having an internal volume of 70 L that had been sufficiently replaced with nitrogen was charged in a nitrogen atmosphere at normal temperature with 31.6 L of dehydrated toluene and further charged with a mixed solution obtained by diluting 1500 g of $SiO_2$ (trade name: Sunsphere H122, manufactured by AGC Si-Tech Co., Ltd.) with 8.0 L of toluene. The inner temperature was raised to 47° C. while performing stirring at a stirring rotational speed of 100 rpm, 1.1 L of a 15% by mass diluted triisobutylaluminum/toluene solution (manufactured by Nippon Aluminum Alkyls Ltd.) was added and, further, 2.0 L of toluene was added. Next, the inner temperature was raised to 50° C., 5.2 L of a 20% by mass diluted methylaluminoxane (hereinafter referred to as MAO)/toluene solution (manufactured by Albemarle Corporation) was added in four divided portions and, further, 2.0 L of toluene was added. Then, mixing was performed for 30 minutes while retaining the inner temperature at 50° C. and performing stirring at a stirring rotational speed of 100 rpm.

Then, the inner temperature was raised to 95 to 98° C. in 45 minutes, and a supporting reaction was carried out for 4 hours. After the end of reaction, the inner temperature was lowered to 55 to 65° C., stirring was stopped, and the vessel was left to stand still for 84 minutes. Then, 32.0 L of supernatant was removed, 51.0 L of toluene was newly added, and the inner temperature was raised to 55 to 65° C. while performing stirring. Stirring was stopped when the inner temperature stabilized at a predetermined temperature, and the vessel was left to stand still for 134 minutes. Then, 51.0 L of supernatant was removed, 7.0 L of toluene was newly added, the temperature was lowered to room temperature, and thereby 25.7 L of an $MAO/SiO_2$/toluene slurry was obtained.

(2) Production of Solid Catalyst (Supporting Metal Catalyst Component onto Carrier)

To a stirrer-equipped pressure vessel having an inner volume of 20 L that had been sufficiently replaced with nitrogen was added in a nitrogen atmosphere at normal temperature 9.8 L (864 g in terms of solid component) of the $MAO/SiO_2$/toluene slurry prepared in (1) above and, further, 2.2 L of n-heptane was added. Then, the inner temperature was raised to 35° C. while performing stirring at a stirring rotational speed of 130 rpm, a solution obtained by diluting 17.5 g of a surfactant (trade name: Adeka Pluronic L-71, manufactured by ADEKA) in 1.0 L of n-heptane was added, and stirring/mixing was performed for 45 minutes. Then, the vessel was left to stand still for 214 minutes, 9.7 L of supernatant was removed, 8.0 L of n-heptane was newly added, the inner temperature was maintained at 35° C. while performing stirring at a stirring rotational speed of 100 rpm, and next the vessel was left to stand still for 177 minutes. Then, 7.0 L of n-heptane was added, 13.5 g of an isomeric mixture represented by formula [VIII] below that had been diluted by 3.0 L of toluene in advance was added, and a complex supporting reaction was carried out at an inner temperature of 35° C. for 60 minutes while performing stirring at a stirring rotational speed of 130 rpm. Next, 0.94 L of a triisobutylaluminum/toluene solution was added, and stirring was performed at an inner temperature of 35° C. for 60 minutes.

[Formula 8]

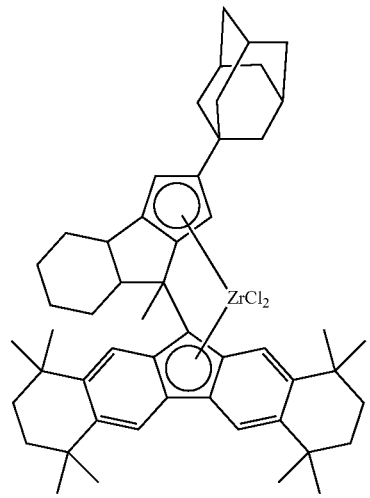

[VIII]

Then, stirring was stopped to leave the vessel to stand still for 31 minutes, 10.9 L of supernatant was removed, 8.0 L of n-heptane was added, stirring was performed at an inner temperature of 35° C. at a stirring rotational speed of 100 rpm, and then the vessel was left to stand still for 23 minutes.

Next, 8.0 L of supernatant was removed, 9.0 L of n-heptane was added, and the temperature was lowered to normal temperature while performing stirring at a stirring rotational speed of 130 rpm. As a result, a solid-catalyst slurry was obtained in an amount of the slurry of 12.3 liters.

(3) Production of Pre-Polymerized Catalyst

A stirrer-equipped pressure vessel having an inner volume of 270 L that had been sufficiently replaced with nitrogen was charged with 43.4 L of n-heptane in a nitrogen atmosphere, 11.8 L (841 g in terms of solid catalyst component) of the solid catalyst slurry prepared in (2) above was added and, further, 28.0 L of n-heptane was added. Then, the stirring rotational speed was set to 150 rpm, and the inner temperature was raised to 35° C. Next, 0.90 L of a triisobutylaluminum/toluene solution was added, and stirring/mixing was performed for 30 minutes.

Next, the inner temperature was maintained at 35° C., 2780 g of ethylene was added, and the reaction was carried out for 360 minutes while performing stirring. After the end of polymerization, unreacted ethylene was replaced with nitrogen to allow solid components to precipitate, and supernatant removal and heptane washing were performed once. The resulting pre-polymerized catalyst was re-suspended in n-heptane for adjustment such that the solid catalyst component concentration was 4.9 g/L, and the amount of the slurry was 171 L. This pre-polymerized catalyst contained 3 g of polyethylene per gram of the solid catalyst component.

(4) Main Polymerization

To a stirrer-equipped vessel polymerizer having an inner volume of 70 L were supplied 116.9 kg/h of propylene as well as hydrogen such that the hydrogen concentration in the vapor phase portion was 0.61 mol %. Then, 1.2 g/h of the slurry of pre-polymerized catalyst produced in (3) above as a solid catalyst component, 8.7 ml/h of triethylaluminum, and 0.4 g/h of a surfactant (trade name: Adeka Pluronic L-72, manufactured by ADEKA) were continuously supplied. The polymerization temperature was 70.0° C., and the pressure was 2.94 MPa/G. The resulting slurry was sent to a stirrer-equipped vessel polymerizer having an inner volume of 1000 L to further perform polymerization. To the polymerizer were supplied 15.9 kg/h of propylene as well as hydrogen such that the hydrogen concentration of the vapor phase portion was 0.47 mol %. Polymerization was performed at a polymerization temperature of 68.9° C. under a pressure of 2.86 MPa/G. The resulting slurry was sent to a stirrer-equipped vessel polymerizer having an inner volume of 500 L to further perform polymerization. To the polymerizer were supplied 7.6 kg/h of propylene as well as hydrogen such that the hydrogen concentration of the vapor phase portion was 0.61 mol %. Polymerization was performed at a polymerization temperature of 67.4° C. under a pressure of 2.78 MPa/G. The resulting slurry was sent to a stirrer-equipped vessel polymerizer having an inner volume of 500 L to further perform polymerization. To the polymerizer were supplied 22.1 kg/h of propylene as well as hydrogen such that the hydrogen concentration of the vapor phase portion was 0.60 mol %. Polymerization was performed at a polymerization temperature of 65.4° C. under a pressure of 2.72 MPa/G.

The resulting slurry was vaporized and then subjected to gas-solid separation, and a propylene polymer was thus obtained. The propylene polymer was obtained at 62 kg/h. Vacuum drying was performed at 80° C. on the propylene polymer.

Characteristics of the propylene homopolymer (PP2) obtained as above are shown in Table 1 below. PP2 does not contain a propylene-ethylene copolymer.

Production Example 3

Production of Propylene Homopolymer (PP3)

(1) Production of Solid Catalyst Carrier

SiO$_2$ (trade name: Sunsphere H121, manufactured by AGC Si-Tech Co., Ltd.) in an amount of 300 g was sampled into a 1 L sidearm flask and slurried by adding 800 mL of toluene. Next, the slurry was transferred to a 5 L four-neck flask, and 260 mL of toluene was added. A 2830 mL methylaluminoxane (hereinafter referred to as MAO)-toluene solution (10% by mass solution) was added. While maintaining room temperature, stirring was performed for 30 minutes. The temperature was raised to 110° C. in 1 hour, and a reaction was carried out for 4 hours. After the end of reaction, the temperature was lowered to room temperature. After cooling, supernatant toluene was removed, and toluene was newly added for replacement until the percentage of replacement reached 95%.

(2) Production of Solid Catalyst (Supporting Metal Catalyst Component onto Carrier)

In a glove box, 1.0 g of diphenylmethylene(3-t-butyl-5-methylcyclopentadienyl)(2,7-t-butylfluorenyl)zirconium dichloride was weighed into a 5 L four-neck flask. The flask was taken out, 0.5 L of toluene and 2.0 L (100 g in terms of solid component) of the MAO/SiO$_2$/toluene slurry prepared in (1) above were added under nitrogen, and stirring was performed for 30 minutes for supporting. The resulting diphenylmethylene(3-t-butyl-5-methylcyclopentadienyl)(2, 7-t-butylfluorenyl)zirconium dichloride/MAO/SiO$_2$/toluene slurry was subjected to 99% replacement with n-heptane such that the final amount of the slurry was 4.5 liters. This procedure was performed at room temperature.

(3) Production of Pre-Polymerized Catalyst

A stirrer-equipped autoclave having an inner volume of 200 L was charged with 101 g of the solid catalyst component prepared in (2) above, 111 mL of triethylaluminum, and 80 L of heptane, the inner temperature was maintained at 15 to 20° C., 303 g of ethylene was added, and a reaction was carried out by performing stirring for 180 minutes. After the end of polymerization, solid components were allowed to precipitate, and supernatant removal and heptane washing were performed twice. The resulting pre-polymerized catalyst was re-suspended in purified heptane and was adjusted with heptane to have a solid catalyst component concentration of 1 g/L. This pre-polymerized catalyst contained 3 g of polyethylene per gram of the solid catalyst component.

(4) Main Polymerization

To a jacketed circulating tubular polymerizer having an inner volume of 58 L were continuously supplied 30 kg/h of propylene, 5 NL/h of hydrogen, 4.4 g/h of the slurry of pre-polymerized catalyst produced in (3) above as a solid catalyst component, and 1.0 ml/h of triethylaluminum, and polymerization was performed, with the polymerizer being completely filled so that there was no vapor phase present. The temperature of the tubular polymerizer was 30° C., and the pressure was 3.1 MPa/G.

The resulting slurry was sent to a stirrer-equipped vessel polymerizer having an inner volume of 1000 L to further perform polymerization. To the polymerizer were supplied 50 kg/h of propylene as well as hydrogen such that the hydrogen concentration of the vapor phase portion was 0.06 mol %. Polymerization was performed at a polymerization temperature of 70° C. under a pressure of 3.0 MPa/G. Next, the resulting slurry was sent to a stirrer-equipped vessel polymerizer having an inner volume of 500 L to further perform polymerization. To the polymerizer were supplied 15 kg/h of propylene as well as hydrogen such that the hydrogen concentration of the vapor phase portion was 0.06 mol %. Polymerization was performed at a polymerization temperature of 69° C. under a pressure of 2.9 MPa/G. Next, the resulting slurry was sent to a stirrer-equipped vessel polymerizer having an inner volume of 500 L to further perform polymerization. To the polymerizer were supplied 12 kg/h of propylene as well as hydrogen such that the hydrogen concentration of the vapor phase portion was 0.06 mol %. Polymerization was performed at a polymerization temperature of 68° C. under a pressure of 2.9 MPa/G. Next, the resulting slurry was sent to a stirrer-equipped vessel polymerizer having an inner volume of 500 L to further perform polymerization. To the polymerizer were supplied 13 kg/h of propylene as well as hydrogen such that the hydrogen concentration of the vapor phase portion was 0.06 mol %. Polymerization was performed at a polymerization temperature of 67° C. under a pressure of 2.9 MPa/G, and a slurry was obtained at 40 kg/h. Finally, the resulting slurry was vaporized, then subjected to gas-solid separation, and vacuum-dried at 80° C.

Characteristics of the propylene homopolymer (PP3) obtained as above are shown in Table 1 below. PP3 does not contain a propylene-ethylene copolymer.

Production Example 4

Production of Propylene Homopolymer (PP4)

(1) Production of Solid Catalyst

After a high-speed stirrer (trade name: TK Homomixer M, manufactured by Tokushu Kika Kogyo Co., Ltd.) having an inner volume of 2 liters was sufficiently substituted with nitrogen, 700 ml of purified decane, 10 g of commercially available magnesium chloride, 24.2 g of ethanol, and 3 g of Rheodol SP-S20 (trade name, manufactured by Kao Corporation, sorbitan distearate) were added to this apparatus. The temperature of the reaction system was raised while stirring this suspension, and this suspension was stirred at 120° C. at 800 rpm for 30 minutes. Next, while being stirred at high speed so as not to generate precipitates, this suspension was transferred using a Teflon (registered trademark) tube having an inner diameter of 5 mm into a 2 liter glass flask (equipped with a stirrer) charged with 1 liter of purified decane that had been cooled to −10° C. in advance. Solids generated by liquid transfer were filtered and sufficiently washed with purified n-heptane, and thereby a solid adduct was obtained in which 2.8 mol of ethanol was coordinated per mol of magnesium chloride.

This solid adduct was formed into a suspension with decane, 23 mmol of the solid adduct in terms of magnesium atom was introduced while being stirred into 100 ml of titanium tetrachloride maintained at −20° C., and a mixed solution was thus obtained. The temperature of this mixed solution was raised to 80° C. over a period of 5 hours, when the temperature reached 80° C., diisobutyl 3,6-dimethylcyclohexane-1,2-dicarboxylate (a mixture of the cis form and the trans form) was added in a proportion of 0.085 mol per mol of magnesium atoms of the solid adduct, and the temperature was raised to 110° C. in 40 minutes. When the temperature reached 110° C., diisobutyl cyclohexane-1,2-dicarboxylate (a mixture of the cis form and the trans form) was further added in a proportion of 0.0625 mol per mol of magnesium atoms of the solid adduct, the temperature was maintained at 110° C. for 90 minutes while performing stirring to thereby react these components.

After the end of 90-minute reaction, the solid portion was collected by hot filtration, this solid portion was re-suspended in 100 ml of titanium tetrachloride, and when the temperature was raised and reached 110° C., the temperature was maintained for 45 minutes while performing stirring to thereby react these components. After the end of 45-minute reaction, the solid portion was collected by hot filtration again, and sufficiently washed with decane and heptane at 100° C. until no free titanium compound was detected in the washings.

A solid titanium catalyst component (α-1) prepared by the above procedure was stored as a decane suspension, and some of it was dried to investigate the catalyst composition. The composition of the solid titanium catalyst component (α-1) thus obtained included 3.2% by mass of titanium, 17% by mass of magnesium, 57% by mass of chlorine, 10.6% by mass of diisobutyl 3,6-dimethylcyclohexane-1,2-dicarboxylate, 8.9% by mass of diisobutyl cyclohexane-1,2-dicarboxylate, and 0.6% by mass of ethyl alcohol residue.

(2) Production of Pre-Polymerized Catalyst

A stirrer-equipped autoclave having an inner volume of 200 L was charged with 150 g of the solid catalyst component prepared in (1) above, 74.4 mL of triethylaluminum, and 75 L of heptane, the inner temperature was maintained at 10 to 18° C., 900 g of propylene was added, and a reaction was carried out by performing stirring for 60 minutes. This pre-polymerized catalyst contained 6 g of polypropylene per gram of transition metal catalyst component.

(3) Main Polymerization

To a stirrer-equipped vessel polymerizer having an inner volume of 1000 L were continuously supplied 132 kg/h of propylene, 1.4 g/h of the slurry of pre-polymerized catalyst as a transition metal catalyst component, 8.4 mL/h of triethylaluminum, and 16.2 mL/h of dicyclopentyl dimethoxysilane, and hydrogen was supplied such that the hydrogen concentration of the vapor phase portion was 2.9 mol %. Polymerization was performed at a polymerization temperature of 74° C. under a pressure of 3.2 MPa/G.

The resulting slurry was sent to a stirrer-equipped vessel polymerizer having an inner volume of 500 L to further perform polymerization. To the polymerizer were supplied 29 kg/h of propylene as well as hydrogen such that the hydrogen concentration of the vapor phase portion was 2.5 mol %. Polymerization was performed at a polymerization temperature of 71° C. under a pressure of 3.1 MPa/G. The resulting slurry was sent to a stirrer-equipped vessel polymerizer having an inner volume of 500 L to further perform polymerization. To the polymerizer were supplied 23 kg/h of propylene as well as hydrogen such that the hydrogen concentration of the vapor phase portion was 2.0 mol %. Polymerization was performed at a polymerization temperature of 69° C. under a pressure of 3.1 MPa/G. The resulting slurry was deactivated and then sent to a washing tank of liquid propylene to wash polypropylene powder.

The resulting slurry was vaporized and then subjected to gas-solid separation, and a propylene polymer was thus obtained. The resulting propylene polymer was introduced into a conical dryer and vacuum-dried at 80° C. Then, 60 grams of pure water and 0.54 liters of propylene oxide were added to 100 kilograms of the product, dechlorination treatment was performed at 90° C. for 2 hours, vacuum drying was performed at 80° C., and polypropylene powder was thus obtained.

Characteristics of the propylene homopolymer (PP4) obtained as above are shown in Table 1 below.

Production Example 5

Production of Propylene Homopolymer (PP5)

(1) Preparation of Solid Titanium Catalyst Component

A homogeneous solution was formed by heating 952 g of anhydrous magnesium chloride, 4420 mL of decane, and 3906 g of 2-ethylhexyl alcohol at 130° C. for 2 hours. To this solution was added 213 g of phthalic anhydride, stirring/mixing was performed at 130° C. for another hour to dissolve phthalic anhydride. After the resulting homogeneous solution was cooled to 23° C., 750 mL of this homogeneous solution was added dropwise over a period of 1 hour to 2000 mL of titanium tetrachloride maintained at −20° C. After dropwise addition, the temperature of the resulting mixture was raised to 110° C. over a period of 4 hours, when the temperature reached 110° C., 52.2 g of diisobutyl phthalate (DIBP) was added, and heating was performed at this temperature for 2 hours. Then, the solid portion was collected by hot filtration, and after this solid portion was re-suspended in 2750 mL of titanium tetrachloride, heating was performed again at 110° C. for 2 hours. After the end of heating, the solid portion was collected by hot filtration again, and washed with decane and hexane at 110° C. until no titanium compound was detected in the wash solutions. The solid titanium catalyst component thus prepared was stored as a hexane slurry. When some of this hexane slurry was dried to investigate the catalyst composition, the solid titanium catalyst component contained 2% by mass of titanium, 57% by mass of chlorine, 21% by mass of magnesium, and 20% by mass of DIBP.

(2) Production of Pre-Polymerized Catalyst

A stirrer-equipped autoclave having an inner volume of 200 L was charged with 120 g of the solid titanium catalyst component prepared in (1) above, 20.5 mL of triethylaluminum, and 120 L of heptane, while maintaining the inner temperature at 5° C., 720 g of propylene was added, and a reaction was carried out by performing stirring for 60 minutes. After the end of polymerization, solid components were allowed to precipitate, and supernatant removal and heptane washing were performed twice.

The resulting pre-polymerized catalyst was re-suspended in purified heptane, and thus a slurry of the pre-polymerized catalyst having a solid titanium catalyst component concentration of 1 g/L was obtained. This pre-polymerized catalyst contained 6 g of a propylene homopolymer per gram of the solid titanium catalyst component.

(3) Main Polymerization

To a stirrer-equipped vessel polymerizer having an inner volume of 100 L were continuously supplied 110 kg/h of propylene, 9.8 g/h of the slurry of pre-polymerized catalyst prepared in (2) above, 5.8 mL/h of triethylaluminum, and 2.6 mL/h of dicyclopentyldimethoxysilane, and hydrogen was supplied such that the hydrogen concentration of the vapor phase portion was 0.9 mol %. Polymerization was performed at a polymerization temperature of 73° C. under a pressure of 3.2 MPa/G.

The resulting slurry was sent to a stirrer-equipped vessel polymerizer having an inner volume of 1000 L to further perform polymerization. To the polymerizer were supplied 30 kg/h of propylene as well as hydrogen such that the hydrogen concentration of the vapor phase portion was 1.3 mol %. Polymerization was performed at a polymerization temperature of 71° C. under a pressure of 3.0 MPa/G. The resulting slurry was sent to a stirrer-equipped vessel polymerizer having an inner volume of 500 L to further perform polymerization. To the polymerizer were supplied 46 kg/h of propylene as well as hydrogen such that the hydrogen concentration of the vapor phase portion was 1.3 mol %. Polymerization was performed at a polymerization temperature of 69° C. under a pressure of 2.9 MPa/G. The resulting slurry was deactivated and then sent to a washing tank of liquid propylene to wash propylene homopolymer powder.

This slurry was vaporized, then subjected to gas-solid separation, introduced into a conical dryer, and vacuum-dried at 80° C. Then, 35.9 grams of pure water and 0.63 liters of propylene oxide were added to 100 kilograms of the product, dechlorination treatment was performed at 90° C. for 2 hours, vacuum drying was performed at 80° C., and a propylene homopolymer was thus obtained.

Characteristics of the propylene homopolymer (PP5) obtained as above are shown in Table 1 below.

Production Example 6

Production of Propylene Homopolymer (PP6)

(1) Production of Solid Catalyst Carrier $SiO_2$ (trade name: Sunsphere H121, manufactured by AGC Si-Tech Co., Ltd.) in an amount of 300 g was sampled into a 1 L sidearm flask and slurried by adding 800 mL of toluene. Next, the slurry was transferred to a 5 L four-neck flask, and 260 mL of toluene was added. A 2830 mL methylaluminoxane (hereinafter referred to as MAO)-toluene solution (10% by mass solution) was added. While maintaining room temperature, stirring was performed for 30 minutes. The temperature was raised to 110° C. in 1 hour, and a reaction was carried out for 4 hours. After the end of reaction, the temperature was lowered to room temperature. After cooling, supernatant toluene was removed, and toluene was newly added for replacement until the percentage of replacement reached 95%.

(2) Production of Solid Catalyst (Supporting Metal Catalyst Component onto Carrier)

In a glove box, 1.0 g of (phenyl)(methyl)methylene(3-t-butyl-5-methylcyclopentadienyl)(1,1,3,6,8,8-hexamethyl-1H,8H-dicyclopenta[b,h]fluorenyl)zirconium dichloride was weighed into a 5 L four-neck flask. The flask was taken out, 0.5 L of toluene and 2.0 L (100 g in terms of solid component) of the $MAO/SiO_2$/toluene slurry prepared in (1) above were added under nitrogen, and stirring was performed for 30 minutes for supporting.

The resulting (phenyl)(methyl)methylene(3-t-butyl-5-methylcyclopentadienyl)(1,1,3,6,8,8-hexamethyl-1H,8H-dicyclopenta[b,h]fluorenyl)zirconium dichloride/$MAO/SiO_2$/toluene slurry was subjected to 99% replacement with n-heptane such that the final amount of the slurry was 4.5 liters. This procedure was performed at room temperature.

(3) Production of Pre-Polymerized Catalyst

A stirrer-equipped autoclave having an inner volume of 200 L was charged with 101 g of the solid catalyst component prepared in (2) above, 111 mL of triethylaluminum, and 80 L of heptane, the inner temperature was maintained at 15 to 20° C., 303 g of ethylene was added, and a reaction was carried out for 180 minutes while performing stirring. After the end of polymerization, solid components were allowed to precipitate, and supernatant removal and heptane washing were performed twice.

The resulting pre-polymerized catalyst was re-suspended in purified heptane so that the solid catalyst component concentration was adjusted by heptane to 1 g/L. This pre-polymerized catalyst contained 3 g of polyethylene per gram of the solid catalyst component.

(4) Main Polymerization

To a jacketed circulating tubular polymerizer having an inner volume of 58 L were continuously supplied 30 kg/h of propylene, 5 NL/h of hydrogen, 2.6 g/h of the catalyst slurry produced in (3) above as a solid catalyst component, and 1.0 ml/h of triethylaluminum, and polymerization was performed, with the polymerizer being completely filled so that there was no vapor phase present. The temperature of the tubular polymerizer was 30° C., and the pressure was 2.6 MPa/G.

The resulting slurry was sent to a stirrer-equipped vessel polymerizer having an inner volume of 1000 L to further perform polymerization. To the polymerizer were supplied 50 kg/h of propylene as well as hydrogen such that the hydrogen concentration of the vapor phase portion was 0.19 mol %. Polymerization was performed at a polymerization temperature of 60° C. under a pressure of 2.5 MPa/G. The resulting slurry was sent to a stirrer-equipped vessel polymerizer having an inner volume of 500 L to further perform polymerization. To the polymerizer were supplied 15 kg/h of propylene as well as hydrogen such that the hydrogen concentration of the vapor phase portion was 0.19 mol %. Polymerization was performed at a polymerization temperature of 59° C. under a pressure of 2.5 MPa/G. The resulting slurry was sent to a stirrer-equipped vessel polymerizer having an inner volume of 500 L to further perform polymerization. To the polymerizer were supplied 12 kg/h of propylene as well as hydrogen such that the hydrogen concentration of the vapor phase portion was 0.19 mol %. Polymerization was performed at a polymerization temperature of 58° C. under a pressure of 2.5 MPa/G. The resulting slurry was sent to a stirrer-equipped vessel polymerizer having an inner volume of 500 L to further perform polymerization. To the polymerizer were supplied 13 kg/h of propylene as well as hydrogen such that the hydrogen concentration of the vapor phase portion was 0.19 mol %. Polymerization was performed at a polymerization temperature of 57° C. under a pressure of 2.4 MPa/G.

The resulting slurry was vaporized and then subjected to gas-solid separation, a product was obtained at 40 kg/h and then vacuum-dried at 80° C., and a propylene homopolymer was thus obtained.

Characteristics of the propylene homopolymer (PP6) obtained as above are shown in Table 1 below. PP6 does not contain a propylene-ethylene copolymer.

Examples 1 to 10

[Preparation of Propylene Homopolymer Compositions]

Each propylene homopolymer was added in a proportion shown in Table 2. Moreover, 0.2 parts by mass of 3,5-di-tert-butyl-4-hydroxytoluene as an antioxidant, 0.2 parts by mass of tetrakis[methylene-3(3,5-di-tert-butyl-4-hydroxyphenyl)propionate]methane as an antioxidant, and 0.01 parts by mass of calcium stearate as a neutralizer were added per 100 parts by mass of the propylene homopolymer for dry-blending. Then, using a uniaxial extruder, melt kneading was performed at a resin temperature of 230° C., and pellets of a propylene homopolymer composition were formed. As a granulator, GMZ50-32 (trade name, manufactured by GM Engineering Co., Ltd., L/D=32, 50 mmφ single screw) was used.

[Formation of Primary Sheet]

Using a 25 mmφ T-die sheet molding machine (manufactured by PLABOR Research Laboratory of Plastics Technology Co., Ltd.), the resulting pellets of the propylene homopolymer composition were melted at 230° C., extruded, and cooled at a drawing rate of 1.0 m/min by one chill roll maintained at 80° C., and a primary sheet having a thickness of 120, 150, or 170 μm was thus obtained.

[Preparation of Film]

The resulting primary sheet was cut to 85 mm×85 mm and biaxially stretched under the following conditions, and a film having a thickness of 2.5 to 4.0 μm was thus obtained.

The preheating temperature width was changed with an increment of 1° C. using a primary sheet having a thickness of 150 μm, and the stretching temperature width was determined from the temperature width in which the film did not break during stretching. A film for high-temperature withstand voltage was prepared by stretching a primary sheet having a different thickness at a temperature located in the center of the temperature range obtained above in which stretching can be performed. The withstand voltage (BDV) of the resulting film was measured according to the above method to calculate the film thickness dependency of withstand voltage (dBDV/dL). Results are shown in Table 2.

<Stretching Conditions>

Stretching apparatus: KARO IV (trade name, manufactured by Bruckner)

Preheating temperature: 145 to 160° C.

Preheating time: 60 seconds

Stretch ratio: Sequential biaxial stretching to 5 times in longitudinal direction (machine direction)×9 times in transverse direction (area stretch ratio: 45)

Stretching rate: 6 m/min

The film thickness was adjusted by way of preheating temperature.

Comparative Examples 1 to 10

Films were obtained in the same manner as in Example 1 except that the formulations of propylene homopolymer compositions were changed as shown in Table 3. The withstand voltages and other properties of the resulting films were measured by the methods described above. Results are shown in Table 3.

Examples 1 to 10 all had a withstand voltage (BDV) of as high as 0.95 kV or more, a withstand-voltage thickness dependency (dBDV/dL) of as small as 0.35 kV/μm or less, and a stretching temperature width of as broad as 7° C. or more, and the stretchability and the high-temperature voltage resistance of thin films were excellent.

On the other hand, although Comparative Example 1 had excellent high-temperature voltage resistance, the stretching temperature width was narrow. Comparative Examples 2 to 10 had poor high-temperature voltage resistance.

TABLE 1

| | Propylene homopolymer | | | | | |
|---|---|---|---|---|---|---|
| | PP1 | PP2 | PP3 | PP4 | PP5 | PP6 |
| MFR (g/10 min) | 4.0 | 3.5 | 4.0 | 4.7 | 3.1 | 4.0 |
| mmmm | 0.95 | 0.98 | 0.91 | 0.97 | 0.98 | 0.94 |
| Half width of elution peak (° C.) | 3.29 | 3.17 | 3.32 | 4.72 | 4.16 | 4.20 |
| Chlorine content (ppm by mass) | <1 | <1 | <1 | 2 | 2 | <1 |
| Mw/Mn | 2.6 | 2.6 | 2.5 | 9.8 | 3.8 | 3.6 |
| 2,1-Insertion (mol %) | 0 | 0 | 0.85 | 0 | 0 | 0 |
| 1,3-Insertion (mol %) | 0 | 0 | 0 | 0 | 0 | 0 |

TABLE 2

| | Example | | | | | | | | | |
|---|---|---|---|---|---|---|---|---|---|---|
| | 1 | 2 | 3 | 4 | 5 | 6 | 7 | 8 | 9 | 10 |
| PP1 (% by mass) | 90 | 80 | 70 | 60 | | | | | 80 | |
| PP2 (% by mass) | | | | | 90 | 80 | 70 | 60 | | 80 |
| PP4 (% by mass) | 10 | 20 | 30 | 40 | 10 | 20 | 30 | 40 | | |
| PP5 (% by mass) | | | | | | | | | 20 | 20 |
| MFR (g/10 min) | 4.0 | 4.0 | 4.0 | 4.0 | 3.4 | 3.6 | 3.5 | 3.7 | 3.9 | 3.4 |
| Chlorine content (ppm by mass) | <1 | <1 | <1 | <1 | <1 | <1 | <1 | <1 | <1 | <1 |
| mmmm | 0.95 | 0.95 | 0.96 | 0.96 | 0.98 | 0.98 | 0.98 | 0.98 | 0.96 | 0.98 |
| BDV (kV) at 120° C. | 1.13 | 1.08 | 1.00 | 0.95 | 1.32 | 1.28 | 1.24 | 1.15 | 1.07 | 1.27 |
| dBDV/dL (kV/μm) | 0.15 | 0.20 | 0.25 | 0.34 | 0.14 | 0.16 | 0.20 | 0.26 | 0.23 | 0.18 |
| Stretching temperature width (° C.) | 8 | 9 | 10 | 11 | 7 | 8 | 8 | 10 | 8 | 7 |

TABLE 3

| | Comparative Example | | | | | | | | | |
|---|---|---|---|---|---|---|---|---|---|---|
| | 1 | 2 | 3 | 4 | 5 | 6 | 7 | 8 | 9 | 10 |
| PP1 (% by mass) | 100 | 40 | 20 | | | 80 | | | | |
| PP2 (% by mass) | | | | 40 | 20 | | 80 | | | |
| PP3 (% by mass) | | | | | | | | 80 | 80 | |
| PP4 (% by mass) | | 60 | 80 | 60 | 80 | | | 20 | | 80 |
| PP5 (% by mass) | | | | | | | | | 20 | 20 |
| PP6 (% by mass) | | | | | | 20 | 20 | | | |
| MFR (g/10 min) | 4.0 | 4.0 | 4.0 | 3.8 | 3.9 | 4.0 | 3.5 | 4.0 | 3.7 | 3.7 |
| Chlorine content (ppm by mass) | <1 | <1 | <1 | <1 | <1 | <1 | <1 | <1 | <1 | <1 |
| mmmm | 0.95 | 0.96 | 0.97 | 0.97 | 0.97 | 0.95 | 0.97 | 0.92 | 0.92 | 0.97 |
| BDV (kV) at 120° C. | 1.16 | 0.78 | 0.72 | 0.81 | 0.76 | 0.83 | 0.93 | 0.74 | 0.68 | 0.92 |
| dBDV/dL (kV/μm) | 0.15 | 0.65 | 0.63 | 0.68 | 0.67 | 0.21 | 0.18 | 0.16 | 0.23 | 0.72 |
| Stretching temperature width (° C.) | 6 | 16 | 16 | 14 | 15 | 14 | 6 | 16 | 14 | 13 |

Reference Examples 1 and 2

Pellets of propylene homopolymer compositions were obtained in the same manner as in Example 1 except that the formulations of propylene homopolymer compositions were changed as shown in Table 4.

[Formation of Primary Sheet]

Using a 25 mmφ T-die sheet molding machine (manufactured by PLABOR Research Laboratory of Plastics Technology Co., Ltd.), the resulting pellets of the propylene homopolymer composition were melted at 230° C., extruded, and cooled at a drawing rate of 1.0 m/min by one chill roll maintained at 80° C., and a primary sheet having a thickness of 150, 175, or 200 μm was thus obtained.

[Preparation of Film]

The resulting primary sheet was cut to 85 mm×85 mm and biaxially stretched under the following conditions, and a film having a thickness of more than 4.0 μm and 6.0 μm or less was thus obtained.

The preheating temperature width was changed with an increment of 1° C. using a primary sheet having a thickness of 200 μm, and the stretching temperature width was determined from the temperature width in which the film did not break during stretching. A film for high-temperature withstand voltage was prepared by stretching a primary sheet having a different thickness at a temperature located in the center of the temperature range obtained above in which stretching can be performed. The withstand voltage (BVD) of the resulting film was measured by the method described above. Results are shown in Table 4.

<Stretching Conditions>

Stretching apparatus: KARO IV (trade name, manufactured by Bruckner)
Preheating temperature: 145 to 160° C.
Preheating time: 60 seconds
Stretch ratio: Sequential biaxial stretching to 5 times in longitudinal direction (machine direction)×7 times in transverse direction (area stretch ratio: 35)
Stretching rate: 6 m/min In Reference Examples 1 and 2, the films had excellent high-temperature voltage resistance and, also, the stretching temperature width was broad. This is because the primary sheets were thick and, accordingly, the stretched films were thick, thus having a high BDV, and it is easier to stretch a thicker primary sheet. However, a thin film cannot be obtained from this method. Although a method can be considered in which a thin film is obtained by increasing the stretch ratio, normally there is a limit to the stretch ratio (in particular the stretch ratio with respect to the width direction of a film) of a stretching machine, the space of the stretching zone is increased when a large stretching machine is used, the uniformity of the stretching temperature cannot be maintained, and a thin film cannot be obtained.

TABLE 4

| | Reference Example | |
|---|---|---|
| | 1 | 2 |
| PP1 (% by mass) | 80 | |
| PP2 (% by mass) | | 80 |

TABLE 4-continued

| | Reference Example | |
|---|---|---|
| | 1 | 2 |
| PP4 (% by mass) | 20 | 20 |
| MFR (g/10 min) | 4.0 | 3.6 |
| Chlorine content (ppm by mass) | <1 | <1 |
| mmmm | 0.95 | 0.98 |
| BDV (kV) at 120° C. | 1.38 | 1.59 |
| dBDV/dL (kV/μm) | 1.08 | 1.28 |
| Stretching temperature width (° C.) | 12 | 11 |

The present application is a U.S. National Stage of PCT/JP2015/071633 filed on Jul. 30, 2015, which claims priority to Japanese Patent Application No. 2014-156140 filed on Jul. 31, 2014, the entire disclosures of which are incorporated herein by reference.

The present invention has been described above in reference to embodiments and examples, but the present invention is not limited to the above embodiments and examples. Various modifications can be made to the configurations and details of the present invention within the scope of the present invention as can be understood by those skilled in the art.

INDUSTRIAL APPLICABILITY

A capacitor film obtained from the propylene homopolymer composition of the present invention has excellent high-temperature voltage resistance and thin-film stretchability and, therefore, the industrial value of the propylene homopolymer composition and the capacitor film of the present invention is extremely high.

The invention claimed is:

1. A propylene homopolymer composition for a capacitor film, comprising 50 to 99% by mass of a propylene homopolymer (A1) having characteristics (A-i) to (A-iii) below and 1 to 50% by mass of a propylene homopolymer (B1) produced using a Ziegler-Natta catalyst and having characteristics (B-i) to (B-ii) below (with a sum of the propylene homopolymer (A1) and the propylene homopolymer (B1) being 100% by mass), and having:

(i) a melt flow rate (MFR) of 1.0 to 10.0 g/10 min, and
(ii) a chlorine content of 2 ppm by mass or less,
wherein
(A-i) a mesopentad fraction (mmmm) measured by $^{13}$C-NMR is 0.930 or more,
(A-ii) a half width of an elution peak measured by temperature rising elution fractionation (TREF) is less than 4.0° C.,
(A-iii) a molecular weight distribution Mw/Mn measured by GPC is less than 3.0,
(B-i) a mesopentad fraction (mmmm) measured by $^{13}$C-NMR is 0.950 or more, and
(B-ii) a molecular weight distribution Mw/Mn measured by GPC is 3.8 or more.

2. The propylene homopolymer composition for a capacitor film according to claim 1, wherein the propylene homopolymer (A1) is produced using a metallocene catalyst.

3. A capacitor film obtained by stretching the propylene homopolymer composition for a capacitor film according to claim 1 at an area stretch ratio (area ratio of length×width) of 30 to 80.

4. The propylene homopolymer composition for a capacitor film according to claim 1, wherein a molecular weight distribution Mw/Mn is 3.8 or more and 12.0 or less in the characteristic (B-ii).

5. A propylene homopolymer composition for a capacitor film, comprising 50 to 99% by mass of a propylene homopolymer (A1) having characteristics (A-i) to (A-iii) below and 1 to 50% by mass of a propylene homopolymer (B1) having characteristics (B-i) to (B-ii) below (with a sum of the propylene homopolymer (A1) and the propylene homopolymer (B1) being 100% by mass), and having:

a melt flow rate (MFR) of 1.0 to 10.0 g/10 min, and
(ii) a chlorine content of 2 ppm by mass or less,
wherein
(A-i) a mesopentad fraction (mmmm) measured by $^{13}$C-NMR is 0.930 or more,
(A-ii) a half width of an elution peak measured by temperature rising elution fractionation (TREF) is less than 4.0° C.,
(A-iii) a molecular weight distribution Mw/Mn measured by GPC is less than 3.0,
(B-i) a mesopentad fraction (mmmm) measured by $^{13}$C-NMR is 0.950 or more, and (B-ii) a molecular weight distribution Mw/Mn measured by GPC is 3.8 or more.

6. A capacitor film having a thickness of 1 to 50 μm, comprising the propylene homopolymer composition for a capacitor film according to claim 1.

7. The capacitor film according to claim 6, having a thickness of 1 to 4 μm.

8. The capacitor film according to claim 6, which is a capacitor separator film.

* * * * *